US012091255B2

(12) United States Patent
Fourney et al.

(10) Patent No.: US 12,091,255 B2
(45) Date of Patent: Sep. 17, 2024

(54) CONVEYOR SYSTEM FOR SELECTIVELY DIVERTING OBJECTS

(71) Applicant: Laitram, L.L.C., Harahan, LA (US)

(72) Inventors: Matthew L. Fourney, Laurel, MD (US); Joseph F. Kovacs, New Orleans, LA (US); Angela Longo Marshall, Harahan, LA (US); Christopher B. Spicer, Silver Spring, MD (US); John E. Wenzel, Madisonville, LA (US); Yorrick Mulder, Baltimore, MD (US)

(73) Assignee: Laitram, L.L.C., Harahan, LA (US)

(*) Notice: Subject to any disclaimer, the term of this patent is extended or adjusted under 35 U.S.C. 154(b) by 97 days.

(21) Appl. No.: 18/013,728

(22) PCT Filed: Jul. 20, 2021

(86) PCT No.: PCT/US2021/042303
§ 371 (c)(1),
(2) Date: Dec. 29, 2022

(87) PCT Pub. No.: WO2022/020307
PCT Pub. Date: Jan. 27, 2022

(65) Prior Publication Data
US 2023/0278806 A1 Sep. 7, 2023

Related U.S. Application Data

(60) Provisional application No. 63/054,362, filed on Jul. 21, 2020.

(51) Int. Cl.
*B65G 17/24* (2006.01)
*B65G 47/54* (2006.01)
*B65G 47/64* (2006.01)

(52) U.S. Cl.
CPC ............. *B65G 17/24* (2013.01); *B65G 47/54* (2013.01); *B65G 47/642* (2013.01); *B65G 2207/34* (2013.01); *B65G 2207/48* (2013.01)

(58) Field of Classification Search
CPC ....... B65G 17/24; B65G 47/54; B65G 47/642
(Continued)

(56) References Cited

U.S. PATENT DOCUMENTS 3,679,043 A * 7/1972 Becker ................... B65G 47/54
198/572
6,571,937 B1 * 6/2003 Costanzo ............... B65G 13/10
198/779
(Continued)

*Primary Examiner* — Douglas A Hess
(74) *Attorney, Agent, or Firm* — Catherine M. Bishop

(57) ABSTRACT

A conveyor system includes a conveyor belt having a plurality of article-diverting conveyor belt rollers. An underlying drive roller assembly includes a plurality of pivotable rollers carriers, each having a freely rotatable drive roller that contacts the conveyor belt rollers from below. An actuator engages an orientation device to pivot the carriers and change the orientation of the drive rollers. The drive rollers may also move into and out of engagement with the conveyor belt rollers as their orientation changes. The orientation device is sandwiched between three-dimensional support plates to adjust the orientation of the drive rollers relative to the belt rollers. A top support plate includes corrugated vertical walls forming wearstrip holders. The orientation device may raise or lower the drive rollers during pivoting of the roller carriers. The drive roller assembly may be a modular assembly that can be customized for varying sizes, shapes and configurations.

22 Claims, 26 Drawing Sheets

(58) Field of Classification Search
USPC .................................. 198/348, 779, 850
See application file for complete search history.

(56) References Cited

U.S. PATENT DOCUMENTS

| | | | |
|---|---|---|---|
| 7,237,670 B1 | 7/2007 | Ryan | |
| 7,364,038 B2 * | 4/2008 | Damkjaer | B65G 17/32 |
| | | | 198/853 |
| 7,461,739 B2 | 12/2008 | Fourney | |
| 7,506,751 B2 | 3/2009 | Fourney | |
| 7,533,766 B1 | 5/2009 | Fourney | |
| 8,167,118 B2 * | 5/2012 | Fourney | B65G 17/24 |
| | | | 198/779 |
| 9,079,717 B1 * | 7/2015 | Costanzo | B65G 39/025 |
| 9,505,557 B2 * | 11/2016 | Wilkins | B65G 23/02 |
| 10,543,986 B1 | 1/2020 | Sines | |
| 11,952,220 B2 * | 4/2024 | Fourney | B65G 47/82 |
| 2011/0022221 A1 | 1/2011 | Fourney | |
| 2016/0167893 A1 | 6/2016 | Myers | |

* cited by examiner

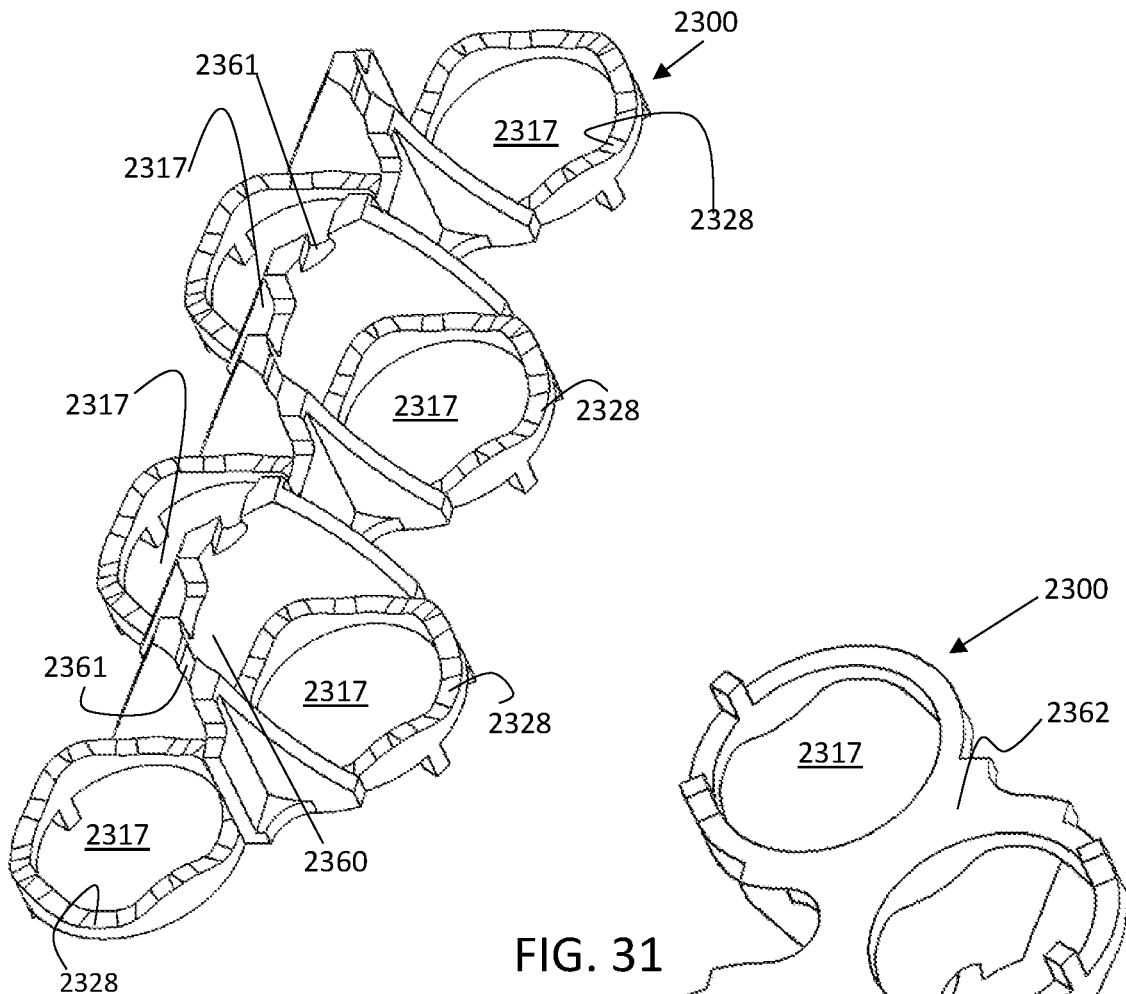
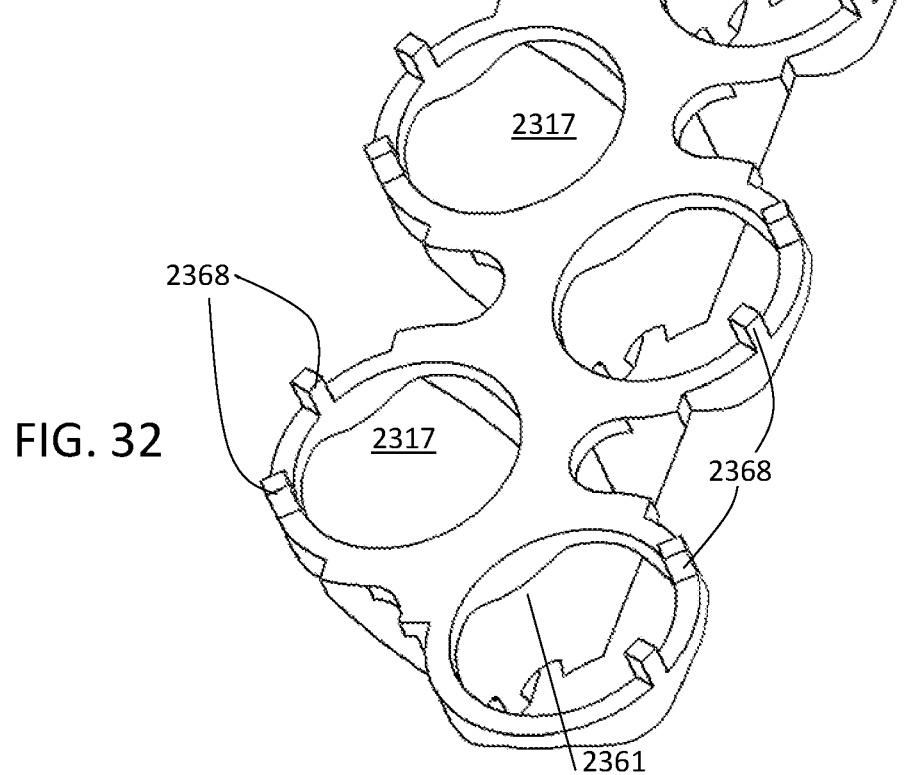
FIG. 31
FIG. 32

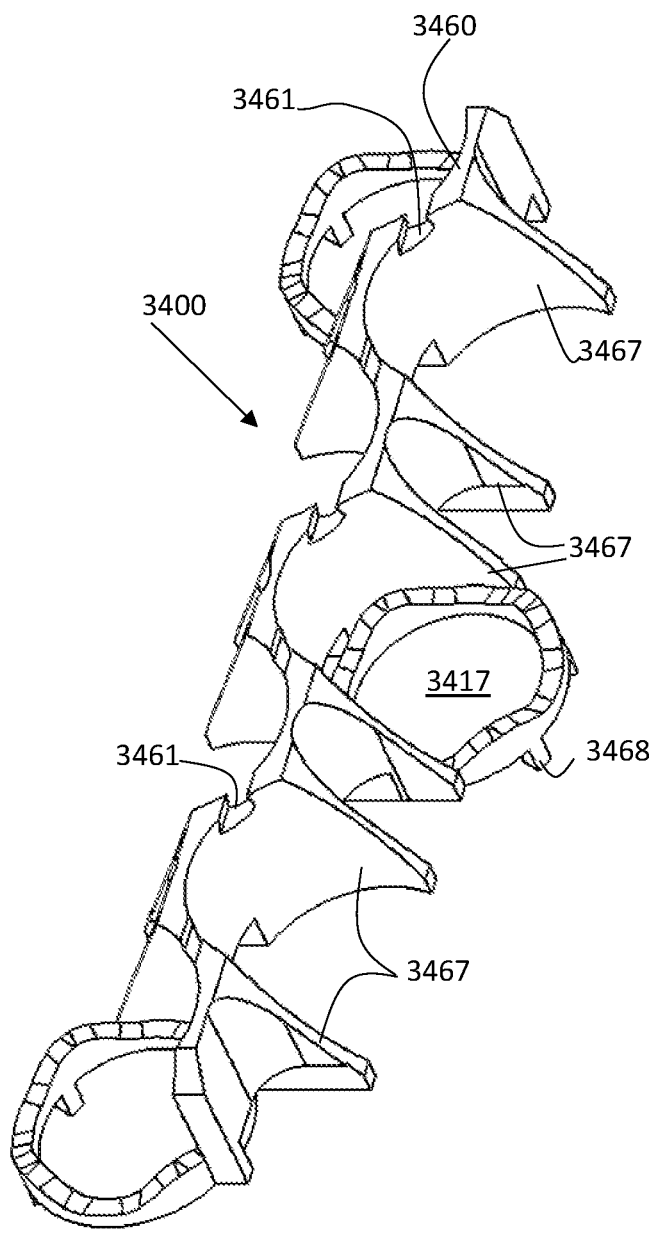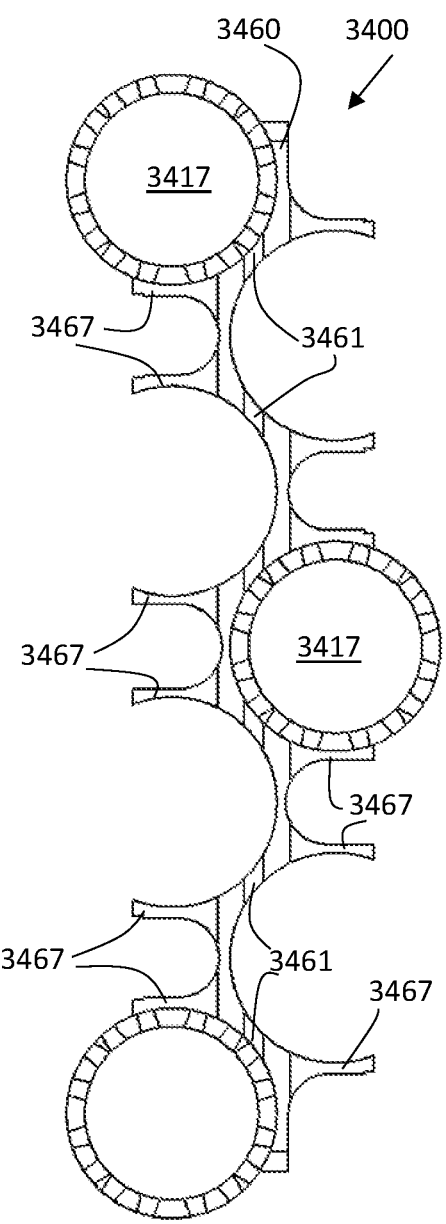
FIG. 36
FIG. 37

CONVEYOR SYSTEM FOR SELECTIVELY DIVERTING OBJECTS

RELATED APPLICATIONS

The present application claims priority to U.S. Provisional Patent Application No. 63/054,363, filed Jul. 21, 2020 and entitled "Conveyor System for Selectively Diverting Objects", the contents of which are herein incorporated by reference.

BACKGROUND

The invention relates generally to power-driven conveyors and, more particularly, to conveyor systems having conveyor belts with object-supporting rollers rotated by contact with a drive mechanism having freely rotatable drive rollers whose orientations are changeable to cause the object-supporting rollers to rotate in one direction or another.

It is often necessary to divert objects from a conveyor belt, for example to another conveyor belt, for purposes of routing or positioning the objects for processing of one type or another.

U.S. Pat. No. 7,506,751, Mar. 24, 2009, to Matthew L. Fourney describes a conveyor system for diverting objects carried atop a conveyor belt having object-supporting rollers. As the conveyor belt advances in a direction of belt travel, the belt rollers ride on freely rotatable drive rollers supporting the conveyor belt from below. The belt rollers are arranged in lanes and rotate on axes parallel to the direction of bet travel. The drive rollers are mounted in pivotable cartridges. An actuator coupled to the cartridges pivots the cartridges and the drive rollers in place and in contact with the belt rollers. When the drive rollers are pivoted to oblique angles relative to the conveyor belt rollers, the belt rollers are rotated to direct conveyed objects toward one side of the conveyor belt or the other depending on the angle of the drive roller relative to the direction of belt travel.

SUMMARY

One version of a conveyor system embodying features of the invention comprises a conveyor belt having a plurality of conveyor belt rollers configured to divert objects atop the rollers as the belt advances and a drive roller assembly for selectively driving the conveyor belt rollers. The drive roller assembly includes a plurality of pivotable rollers carriers, each having an orientation element and a freely rotatable drive roller that contacts the conveyor belt rollers from below. An actuator engages the carrier orientation element to pivot the carrier and change the orientation of the drive rollers with respect to the conveyor belt rollers. The drive rollers may also move into and out of engagement with the conveyor belt rollers as their orientation with respect to the conveyor belt rollers changes. Wearstrips may be inserted into notches forming in the drive roller assembly to form a carryway across the width of the drive roller assembly. The drive roller assembly may be a modular assembly that can be customized for varying sizes, shapes and configurations.

According to one aspect, a drive roller assembly for selectively actuating conveyor belt rollers in a conveyor belt configured to divert objects atop the conveyor belt rollers as the conveyor belt advances along a carryway is provided. The drive roller assembly comprises a plurality of pivotable roller carriers housing freely rotatable drive rollers that contact the conveyor belt rollers from below the conveyor belt, a three-dimensional top support plate, a translatable orientation device for engaging the pivotable roller carriers to change the orientation of the drive rollers with respect to the conveyor belt rollers and an actuator for selectively moving the translatable orientation device to pivot the pivotable roller carriers. The three-dimensional top support plate includes an array of openings arranged in a quincunx pattern. The roller carriers extend through the openings. The three-dimensional top support plate includes at least one corrugated vertical wall extending longitudinally on the top support plate between a first and second column of openings, each corrugated vertical wall including a plurality of notches in a top edge for receiving a wearstrip. Each curve in the corrugated vertical wall partially surrounds an opening.

According to another aspect, an orientation plate for a drive roller assembly comprises a planar substrate with a plurality of elongated openings, a cam mechanism including a carrier opening for receiving a roller carrier within an elongated opening and a flexible leaf connecting the cam mechanism to the planar substrate.

According to another aspect, a wearstrip holder for a drive roller assembly comprises a corrugated vertical wall extending longitudinally and a plurality of notches in an upper edge of the wall for receiving a wearstrip.

According to another aspect, a method of assembling a drive roller assembly comprises the steps of inserting a plurality of fasteners into lateral top slots extending from a top wall of a support frame and placing a plurality of bottom support plate modules over the support frame, such that a plurality of fasteners are inserted through fastener openings in each bottom support plate modules. Each bottom support plate module includes an array of bottom roller carrier openings. The method further comprises the steps of placing a translatable orientation device over the plurality of bottom support plate modules, each translatable orientation device including an array of elongated orienting openings, each elongated orienting opening including a linear array of teeth, and then placing a plurality of top support plate modules over the translatable orientation device, such that a plurality of fasteners are inserted through fastener openings in each top support plate module. Each top support plate modules includes an array of top roller carrier openings. The method further comprises the steps of aligning and fastening edge top and bottom support plate modules to each other, aligning remaining top and bottom support plate modules relative to the edge top and bottom support plate modules using an alignment tool, fastening remaining top and bottom support plate modules to each other and aligning the translatable orientation device relative to the top and bottom support plate modules using the alignment tool, so that the bottom roller carrier openings, orienting openings and top roller carrier openings are aligned with each other. The method then comprises the steps of attaching a moving actuator clevis to the translatable orientation device, mounting an actuator and static actuator clevis within the support frame and inserting roller carriers through the aligned top roller carrier openings, orienting openings and bottom roller carrier openings.

BRIEF DESCRIPTION OF THE DRAWINGS

The disclosed systems and methods can be understood with reference to the following drawings. The components in the drawings are not necessarily to scale.

FIG. 31 is an isometric top view of the corrugated insert of FIG. 30;

FIG. 32 is an isometric bottom view of the corrugated insert of FIG. 31;

FIG. 36 is an isometric top view of a corrugated insert according to another embodiment;

FIG. 37 is a top view of the corrugated insert of FIG. 36;

DETAILED DESCRIPTION

As described above, existing conveyor systems that include conveyor belt rollers, although providing advantages over previous systems, still have limitations.

Figure 1:
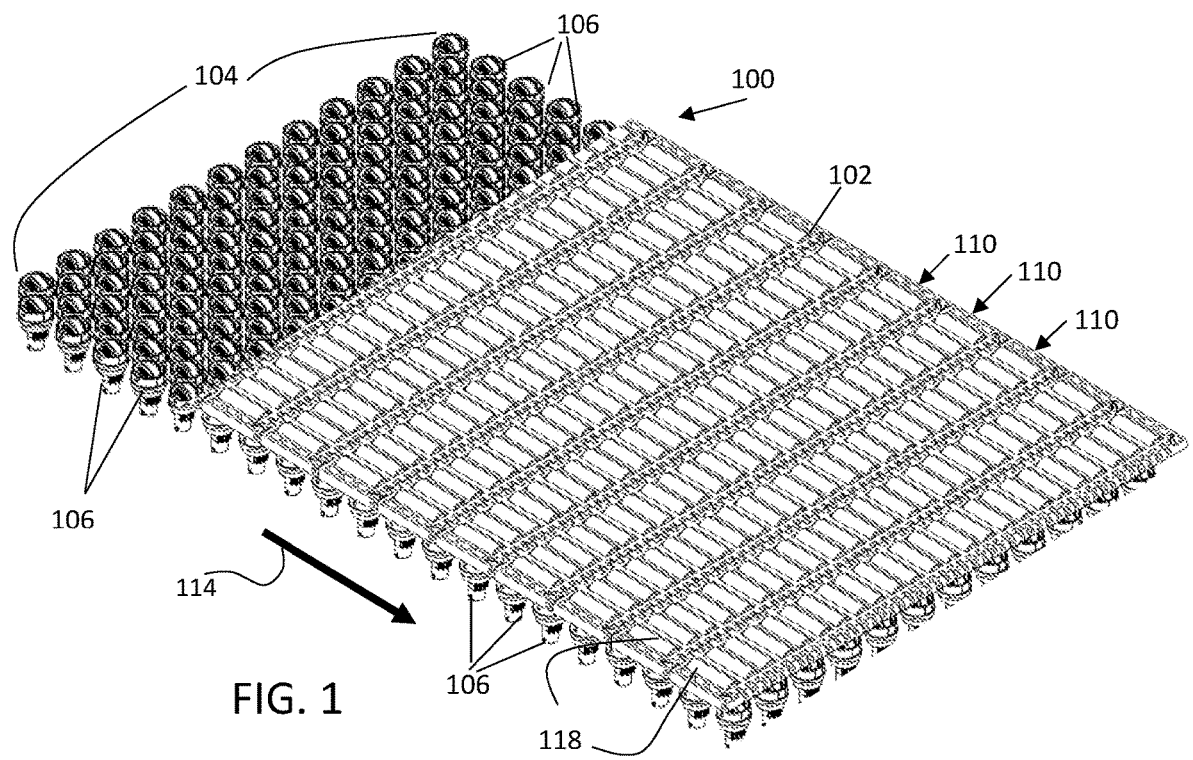
FIG. 1 is an isometric view of a portion of a conveyor system that can be adjusted to divert objects at various angles to either side of the system according to an embodiment.
Figure 2:
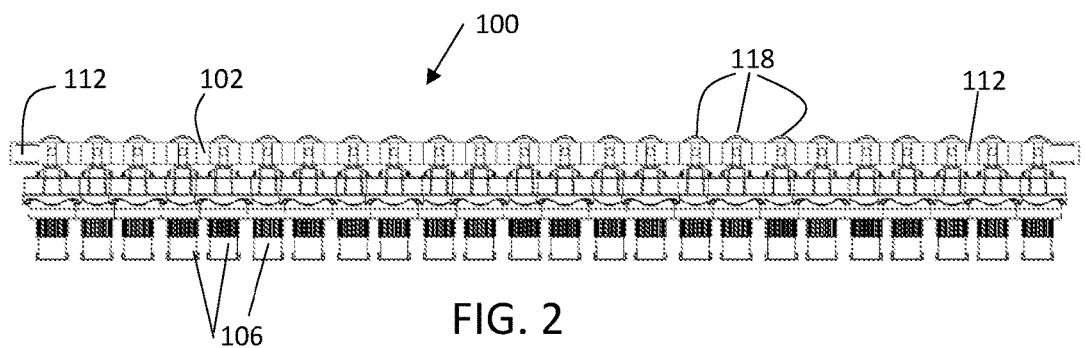
FIG. 2 is a front view of the portion of FIG. 1.

Referring to the figures, in which like numerals indicate corresponding parts throughout the several views, FIGS. 1 and 2 illustrate an embodiment of a portion of a conveyor system 100 that can be adjusted to divert objects at various angles to either side of the system. As indicated in FIGS. 1 and 2, the conveyor system 100 comprises a roller conveyor belt 102 and a field 104 of angularly adjustable "drive" roller modules 106 below the conveyor belt. In the embodiment of FIGS. 1 and 2, the conveyor belt 102 comprises a plurality of hingedly-connected transverse modular conveyor belt modules 110. The belt is constructed of a series of rows of one or more belt modules connected side to side and end to end at hinge joints into an endless belt loop advancing along a portion of a conveyor carryway in a direction of belt travel 114. The conveyor belt is reversible and may travel in an opposite longitudinal direction from direction 114.

One or more of the conveyor belt modules 110 includes free-spinning conveyor belt rollers 118 for selectively diverting objects carried by the conveyor belt 102. The object-supporting rollers 118 can be mounted on axles and extend longitudinally in the direction of belt travel 114 to enable the object-supporting rollers 118 to selectively divert objects to either side of the conveyor belt. For the purposes of this disclosure, the term "free-spinning" means that the rollers are free to spin about their axes of rotation in either angular direction. Therefore, the rollers 118 may be said to comprise "idler" rollers that will freely rotate in either angular direction when driven by an appropriate force. In the embodiment of FIGS. 1 and 2, the rollers 118 are positioned such that their axes of rotation are parallel to the direction of belt travel 114. The rollers 118 can be alternately provided in another orientation.

The conveyor belt rollers 118 are made of metal and/or plastic or another suitable material and may be provided with a rubber or plastic high-friction outer layer or coating that prevents slippage when rollers of the drive roller modules 106 are brought into contact with the conveyor belt rollers. The rollers 118 are dimensioned so as to extend beyond the upper and lower surfaces of the conveyor belt 102 (and belt module bodies 112) such that they can both divert objects placed on the conveyor belt 102 and can be selectively driven from below by the drive roller modules 106, though the invention is not limited.

Figure 3:
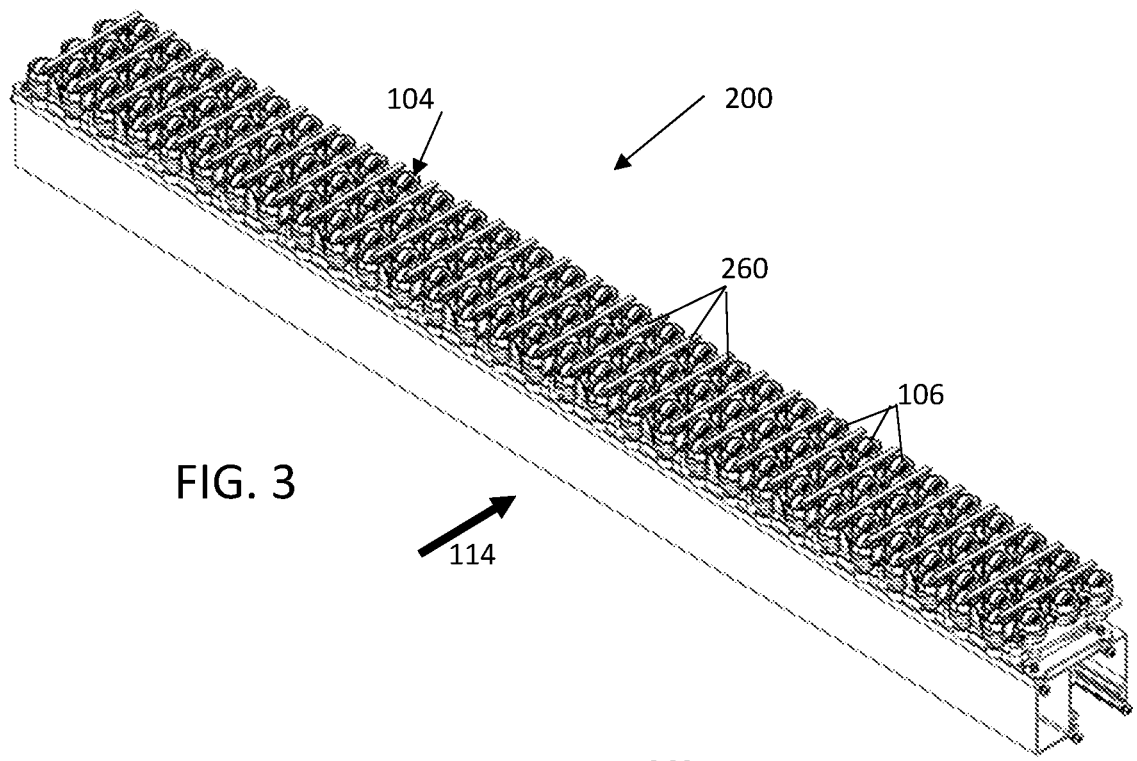
FIG. 3 is an isometric view of a drive roller assembly for selectively activating object-diverting conveyor belt rollers in the conveyor system of FIG. 1.
Figure 4:
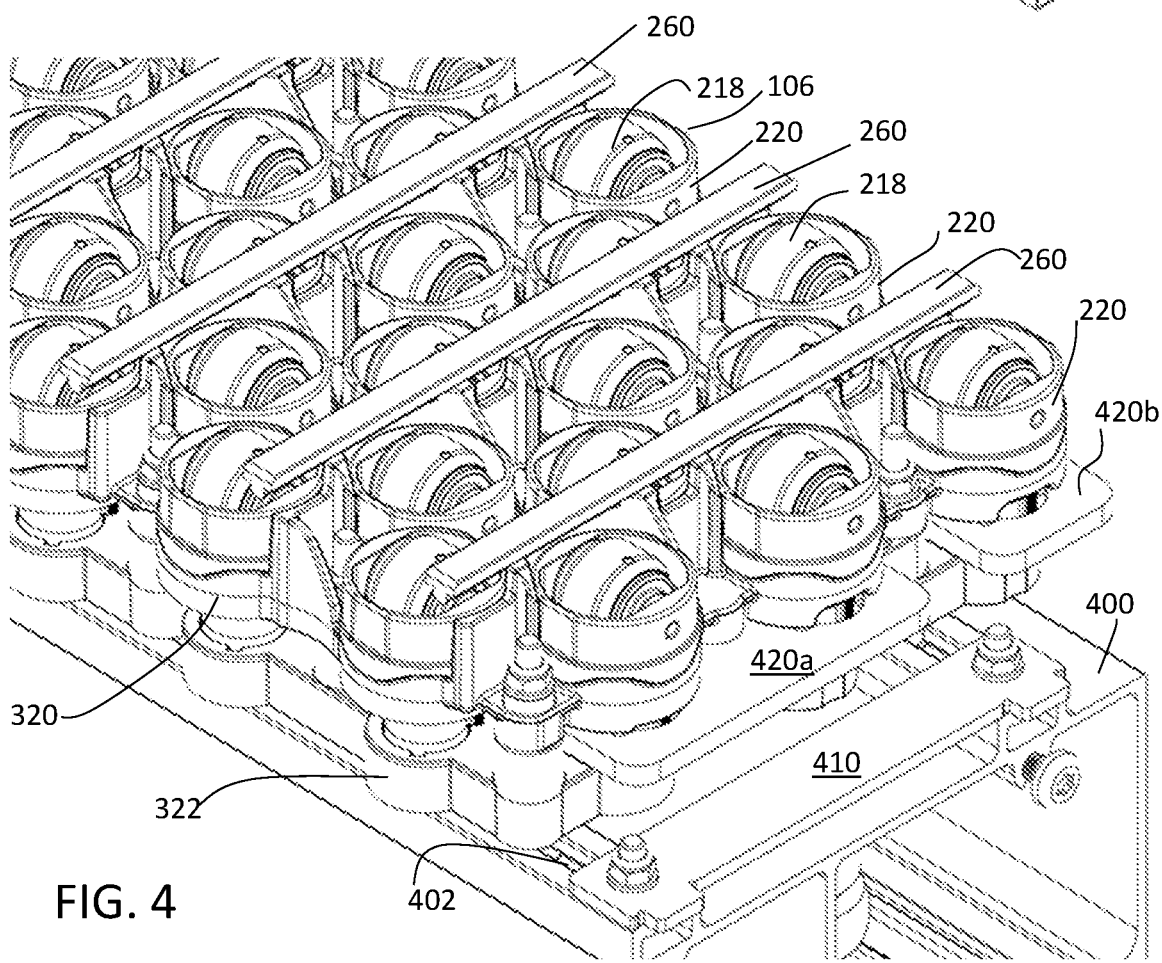
FIG. 4 is a detailed close-up view of a portion of the drive roller assembly of FIG. 3.
Figure 5:
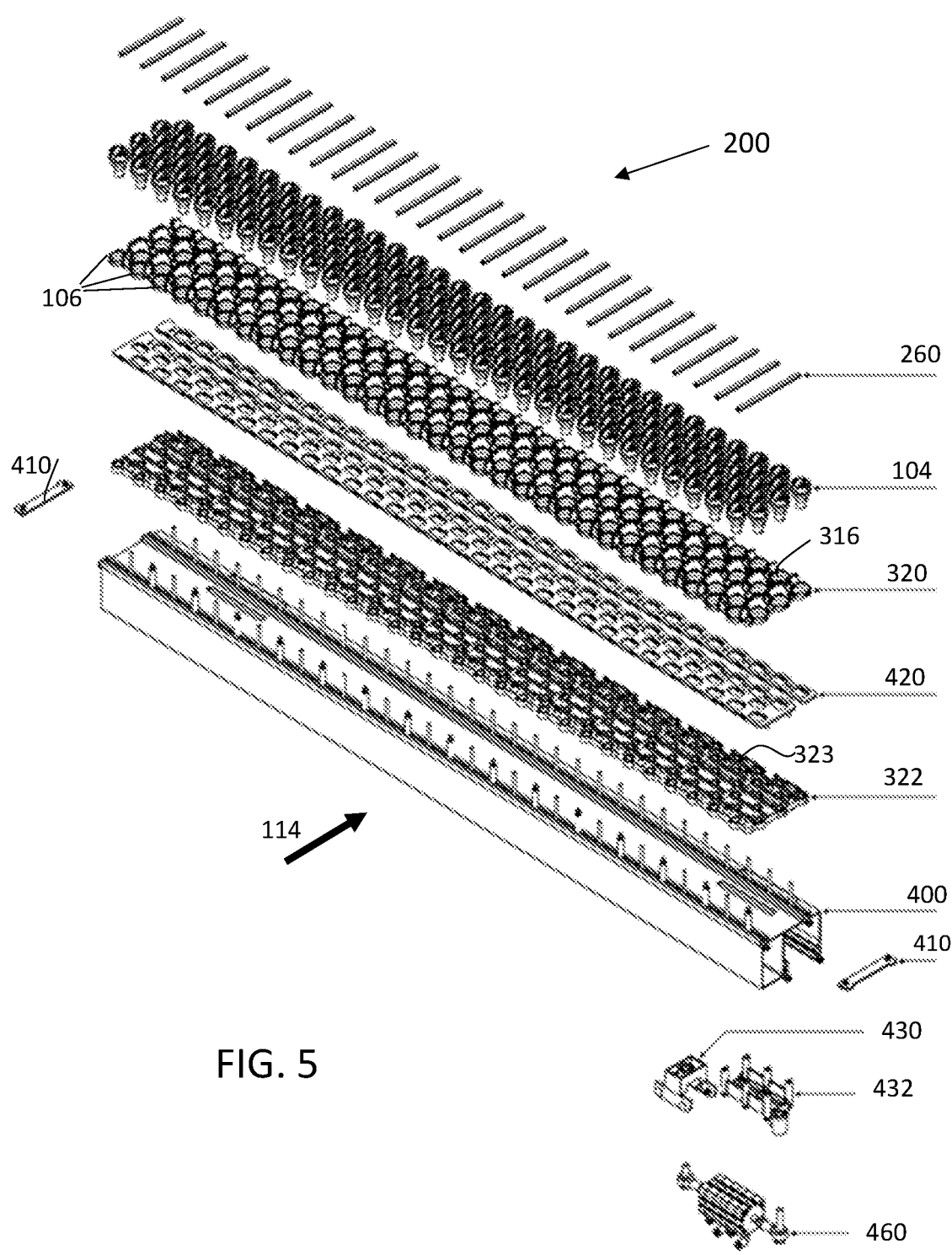
FIG. 5 is an exploded view of the drive roller assembly of FIG. 3.

Referring to FIGS. 3-5, the field 104 of angularly adjustable drive roller modules 106 comprises one or more drive roller assemblies 200, each assembly 200 individually controlled and actuatable. A conveyor 100 may include multiple drive roller assemblies 200 arranged in various configurations to customize or otherwise vary the number, arrangement and-or size of the field 104 of drive rollers modules 106. Each drive roller assembly 200 comprises an array of drive roller modules 106 for selectively engaging conveyor belt rollers 118. Each drive roller module 106 comprises a freely-rotatable drive roller 218 housed in a roller carrier 220 to form an angularly adjustable roller module 106. Each roller carrier 220 can pivot about a vertical axis to change the orientation of the drive roller 218. The rolling contact between the belt rollers 118 and the drive rollers 218 causes them both to roll on each other and rotate as long as their axes are oblique to each other. In the illustrative array of drive rollers 218, each column of drive rollers is offset longitudinally (in a direction of belt travel 114) from an adjacent column of drive rollers in a quincunx pattern, to increase the density of the array, though the invention is not so limited.

The roller carriers 220 are mounted through a shaped, three-dimensional top support plate 320, which may comprise a plurality of modular plates extending laterally across the width of the assembly 200. The top support plate 320 includes a plurality of openings 316 arranged in longitudinal columns 318 and lateral rows 319. The columns of openings are laterally aligned with the lateral positions of the conveyor belt rollers 118, with adjacent columns staggered relative to each other in a quincunx pattern to increase density, but the invention is not so limited. Each opening 316 rotatably receives a roller carrier 220 supporting a freely-rotatable drive roller 218, which selectively engages the belt rollers 118 in the corresponding column as the belt 102 advances in the direction of belt travel 114. The openings 316 are shaped and three-dimensional, having vertical walls extending up and circumscribing a portion of each roller carrier, as well as forming wear-strip receptacles and camming surfaces to selectively raise and lower the roller carriers 220, as described below.

A translatable orientation device 420 engages orientation elements on the roller carriers 220 to selectively pivot the roller carriers 220 and their carried drive rollers 218 about their vertical axes. An actuator 460 selectively shifts the translatable orientation device 420 laterally to pivot the roller carriers 220 about their vertical axes. In the illustrative embodiment, the translatable orientation device 420 includes two spaced-apart translatable orientation plates 420a, 420b, which are joined together by a moving actuator clevis 432, so that the translatable orientation plates 420a, 420b operate in unison. The translatable orientation device 420 may comprise multiple modules arranged laterally across the width of the assembly 200, or may span the width of the assembly.

A bottom support plate 322, which may comprise a plurality of modular plates extending laterally across the width of the assembly 200, below the translatable orientation device 420 is connected to the top support plate 320 and provides lower bearing surfaces for the roller carriers 220. Carrier openings 323 in the bottom support plate 322 receive the bottom portions of the roller carriers 220. The openings 323 in the bottom support plate 322 are vertically aligned with, but smaller than the openings 316 in the upper support plate. The openings 323 help align the top and bottom support plates to facilitate assembly of the drive roller assembly, in addition to confining the roller carriers 220 in rotation on fixed vertical axes. The bottom support plate 320 and top support plate 322 are fixed relative to each other and static, with the translatable orientation device 420 slidably sandwiched in between the support plates 320, 322. The illustrative top and bottom support plates 320, 322 can be formed of plastic or another suitable material. In one embodiment, the top and-or bottom support plates are formed through an injection molding process, 3-D printing or another suitable process.

A support frame 400 below the bottom support plate 322 provides support for the assembly 200. The illustrative support frame 400 comprises an extruded aluminum structural member having a channel shape. In another embodiment, the support frame 400 is formed from "pull-truded" plastic, formed sheet metal or any other suitable material and-or process. Attachment features, such as t-slots, clearance slots and screw bosses are formed in the support frame to attach other components of the assembly 200 to the frame 400, as described below. Alignment tabs 410 on each side of the assembly engage with mating slots in the support frame 400 to precisely align the drive roller assembly 200 in a vertical direction.

A static actuator clevis 430 forms an attachment point to connect a fixed rod eye of the actuator 460 to the support frame 400. A moving actuator clevis 432 connects the dynamic rod eye of the actuator 460 to the translatable orientation plates 420a, 420b, and the plates 420a, 420b to each other. The illustrative actuator 460 is a pneumatically-activated cylinder and piston that can selectively move the orientation plates 420 to effect rotation of the carriers 220 and change the orientation of the drive rollers 218, but any suitable actuator for selectively translating the orientation device 420 in order to change the orientation of the drive rollers 218 may be used.

In addition, the drive roller assembly 200 includes wear-strips 260 forming a carryway for the conveyor belt 102, supporting the conveyor belt across its width. The illustrative wearstrips extend in the direction of belt travel 114 and span the length of the assembly 100 and are spaced apart between every-other column 318 of drive rollers. The illustrative wearstrips are formed of UHMW-PE through extrusion, but the invention is not so limited. Recesses in upper surfaces of the upper support plate 320 are designed to hold the wearstrips 260 in a selected position relative to the drive rollers 218, as described below.

Figure 6:
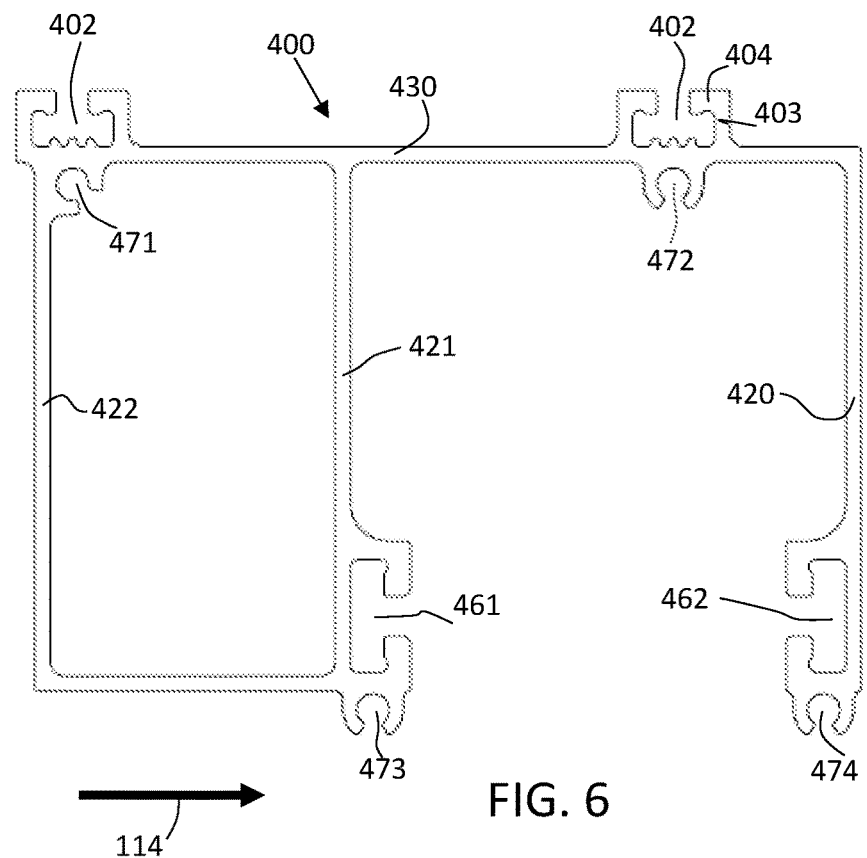
FIG. 6 is an end view of a support frame for a drive roller assembly of FIG. 3.

Referring to FIG. 6, an illustrative the support frame 400 comprises vertical side walls 420, 422, a vertical interior wall 421 and a horizontal top wall 430. Lateral top slots 402 extend from the horizontal top wall 430 for receiving fasteners to connect the top and bottom support plates 320, 322 to the support frame 400, as well as fasteners for connecting the alignment tab 410 to the support frame. The illustrative top slots 402 are formed by vertical slot walls 403 and horizontal upper walls 404 to form a slot in the shape of an upside-down "T". The support frame 400 includes interior slots 461, 462 extending laterally and facing inwards from a first vertical side wall 421 and the vertical interior wall 421 for mounting the actuator 460. Lateral openings 471, 472, 473, 474 receive fasteners to fasten the support frame 400 to a conveyor frame. Each lateral fastener opening 471, 472, 473, 474 is below a T-shaped slot 402, 461 or 462, but the invention is not so limited.

The support frame 400 houses the actuator 460, as well as the static clevis 430 and moving clevis 432. Lateral clearance slots 405 (seen in FIG. 5) in the top wall 430 receive bosses in the moving clevis 432. The moving clevis bosses receive fasteners to secure the moving clevis 432 to the orientation plates 420 to effect translation of the connected orientation plates 420a, 420b when the actuator 460 moves the moving clevis 432, as described below.

The illustrative support frame 400 extends about 6 inches in the longitudinal direction 114, which is the direction of travel of the conveyor belt.

Figure 7:
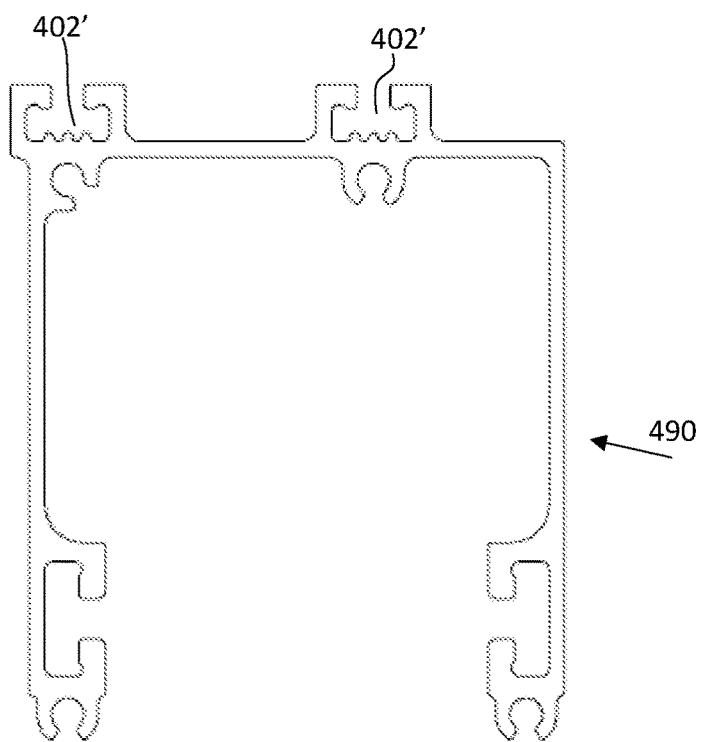
FIG. 7 is an end view of another embodiment of a support frame for a drive roller assembly.

For a shorter support frame 490, as shown in FIG. 7, the central support wall 421 can be omitted, with the lateral t-shaped top slots 402' closer together, depending on a desired configuration.

In an illustrative embodiment, rotation of the roller carrier 220 serves not only to orient the associated drive roller 218, but also to raise and-or lower the drive roller 218 into or out of engagement with a conveyor belt roller 118. Orientation of the drive roller 218 in a non-diverting orientation lowers the drive roller 218 out of engagement with the conveyor belt, while orientation of the drive roller 218 in a diverting orientation raises the drive roller 218 into engagement with the conveyor belt. For example, referring to FIGS. 8, 9A and 9B, in one embodiment, one, several or all of the roller carriers 220 can include cam surfaces that cause the roller carrier 220 to rise automatically relative to the top support plate 320 when the actuator 460 orients the roller carrier 220 in a selected position.

The illustrative self-rising roller carrier 220 comprises a retainer ring 222 with diametrically opposite holes 224 supporting the ends of an axle 219 of a drive roller 218. A downward-facing cam surface 228 is formed on the bottom of the retainer ring 222. The downward-facing cam surface 228 coacts with an upwardly-facing cam surface 328 on the top support plate 320 (shown in FIGS. 9A and 9B) circumscribing the opening 316 in which the roller carrier 220 is received to selectively raise and lower the retainer ring 222 as it pivots about its vertical axis. The illustrative cam surfaces 228, 328 are lobed, with ramp sections, to effect vertical movement of the drive roller 218 during pivoting about a vertical axis, but the invention is not so limited.

Figure 8:
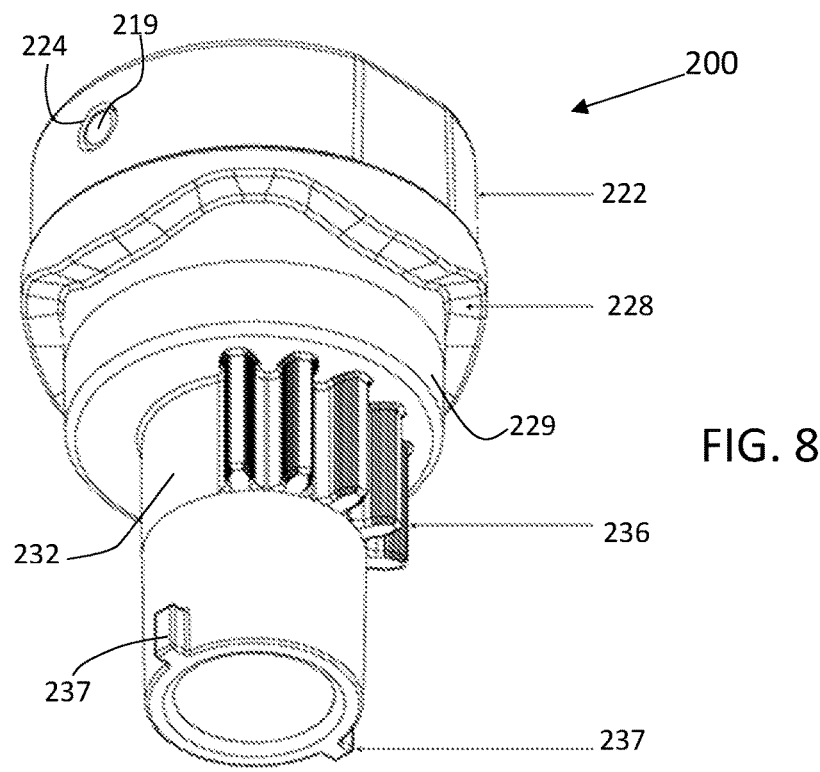
FIG. 8 is an isometric bottom view of a roller carrier of the drive roller assembly of FIG. 3.

Referring to FIG. 8, an upper journal stem 229 extends downwards from the retainer ring 222 and encircles the drive roller bottom. A lower journal stem 232 distal from the retainer ring 222 has a smaller diameter than the upper journal stem 229. The periphery of the lower journal stem 232 is indented inward of the periphery of the upper journal stem 229. In an upper portion, the lower journal stem 232 includes a sector of gear teeth 236 or another suitable orientation element for engaging the translatable orientation device 420 to induce rotation of the roller carrier 220. Other suitable means for orienting the roller carriers may be used. In the illustrative embodiment, the tips of the gear teeth 236 do not extend past the periphery of the upper journal stem 229. The illustrative teeth 236 also do not extend around the entire periphery of the lower journal stem 232, leaving a space in the upper portion of the lower journal stem 232 that lacks teeth. The distal end of the lower journal stem can include locking tabs 237 that engage with slots formed in the bottom support plate 322, as described below, to prevent the roller carriers 220 from disengaging during operation.

Figure 10:
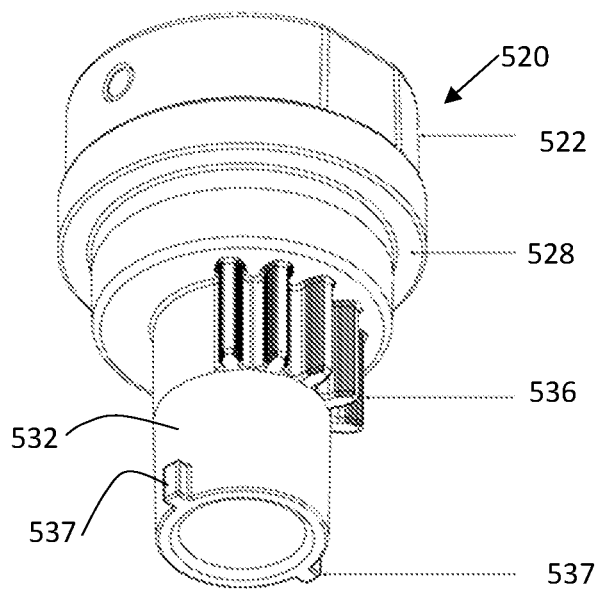
FIG. 10 shows another embodiment of a roller carrier suitable for use in the drive roller assembly of FIG. 3.

In another embodiment, shown in FIG. 10, a roller carrier 520 includes a flat bottom 528 on the bottom of a retainer ring 522, which rides atop the surfaces 328 of the top support plate, to create rotational orienting motion with no vertical linear motion. In this embodiment, the drive roller 218 maintains constant contact with the belt roller 118. The roller carrier 520 is otherwise similar to the roller carrier 220, including teeth 536, a lower journal stem 532 and locking tabs 537.

Referring to FIGS. 9A, 9B, 9C, 9D, 11 and 12 the illustrative top support plate 320 is three-dimensional and modular, each module comprising a planar substrate forming roller carrier openings 316 with shaped camming surfaces 328 forming the rims of the roller carrier openings 316. The openings 316 are arranged in a quincunx pattern, with adjacent columns offset longitudinally from each other, such that the openings in one column are staggered and disposed halfway between the openings of an adjacent column. The illustrative top support plate module 320 comprises four staggered columns and six staggered rows of twelve total openings, but the invention is not so limited, and a top support plate module may comprise any suitable number and arrangement of openings. Multiple top support plate modules 320 can be arranged laterally along the width of the drive roller assembly 200, depending on the width of the particular conveyor belt used with the drive roller assembly 200.

Vertical upper walls 360 extend up from the planar base and terminate in upper edges that include shaped recesses 361 forming holders for the wearstrips 260. As shown in FIGS. 9A, 9B, 9C and 9D, in an illustrative embodiment, the vertical upper walls 360 comprise substantially corrugated vertical walls extending longitudinally in the direction of belt travel 114 between alternating, adjacent columns of openings 316. Each corrugated upper wall 360 has curves that surround at least a portion of the openings 316 in each adjacent column. When the modular drive assembly 200 is assembled, the corrugated vertical walls also surround at least a portion of the roller carriers 220 inserted in the openings 316. The vertical upper walls 360 alternate between the columns, leaving space between every other column. In one column, the vertical wall 360 wraps around a first side of openings 316, while for an adjacent column, the vertical wall 360 wraps around a second side of the openings 316 in the second column. The illustrative top support plate module 320 includes two corrugated vertical walls 360: a first corrugated vertical wall extending longitudinally between the first and second column of openings 316 and a second corrugated vertical wall extending longitudinally between the third and fourth column of openings 316, but the invention is not so limited.

The illustrative wearstrip recesses 361 are formed at inflection points in the corrugated vertical wall, but the invention is not so limited. The illustrative recesses 361 are dovetail-shaped to compressively engage bulb-shaped protrusions on the wearstrips 260, as described below. The recesses 361 may provide an interference fit to secure the wearstrips 260, as described below.

In the illustrative embodiment, the faces of the corrugated vertical walls 360 that face an opening 316 are curved to match the shape of the opening 316, while an opposing face 368 that does not face an opening 316 may be flat, but the invention is not so limited. In addition, corrugated vertical walls 360 at selected or all apexes and troughs may include a notch 365. The corrugated vertical walls 360 may further include buttressing extensions to provide additional support for the structure. In an illustrative embodiment, the buttressing extensions comprise curved gussets 367 having top surfaces 369 that angle down towards the camming surfaces 328. The illustrative curved gussets 367 are formed between the second row and third row of openings 316 and between the fourth row and fifth row of openings alongside each apex, with a shorter gusset 363 extending from the corrugated wall opposite from each curved gusset 367 of each notch 365. Each curved gusset 367 intersects with the corrugated wall main portion and forms a shallow "s" shape with another curved gusset 367 that extends along an opening 316 in an adjacent column. Together, the gussets 363, 367 form a vertical slot with the flat walls 368 along and extending down from each notch 365 for receiving a wearstrip stopper 265, shown in FIGS. 11 and 12.

Figure 9A:
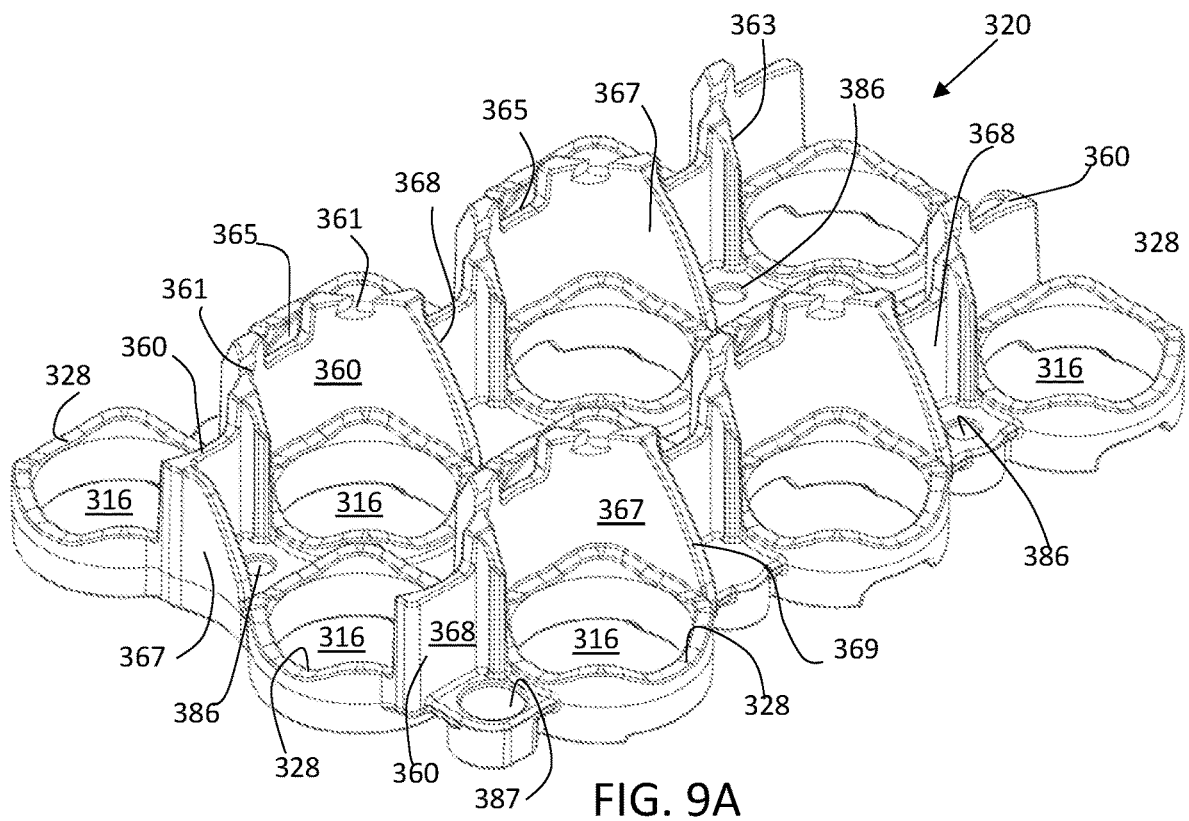
FIG. 9A is an isometric view of a top support plate portion of the drive roller assembly of FIG. 3.
Figure 9B:
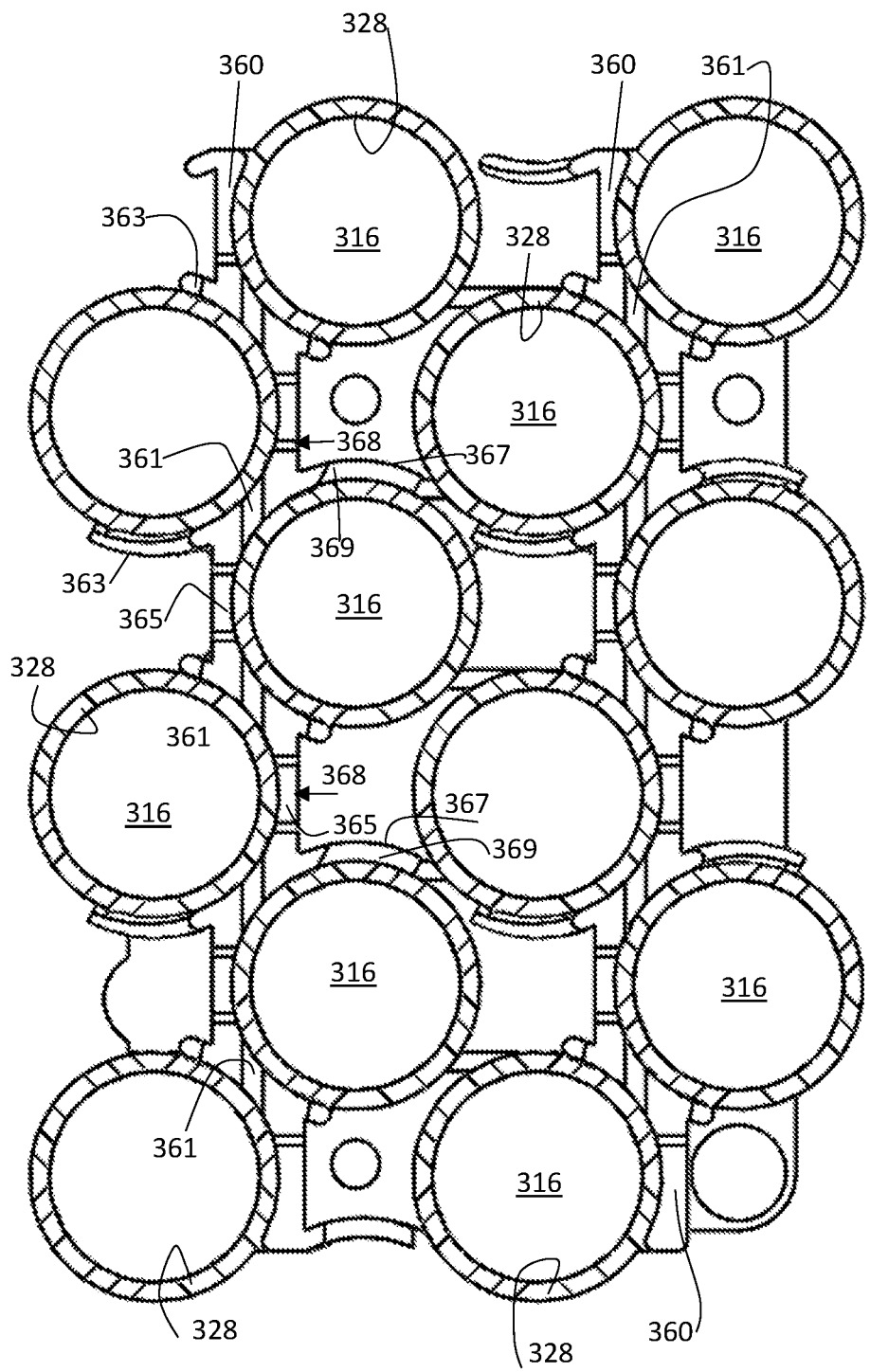
FIG. 9B is a top view of the top support plate portion of FIG. 9A.
Figure 9C:
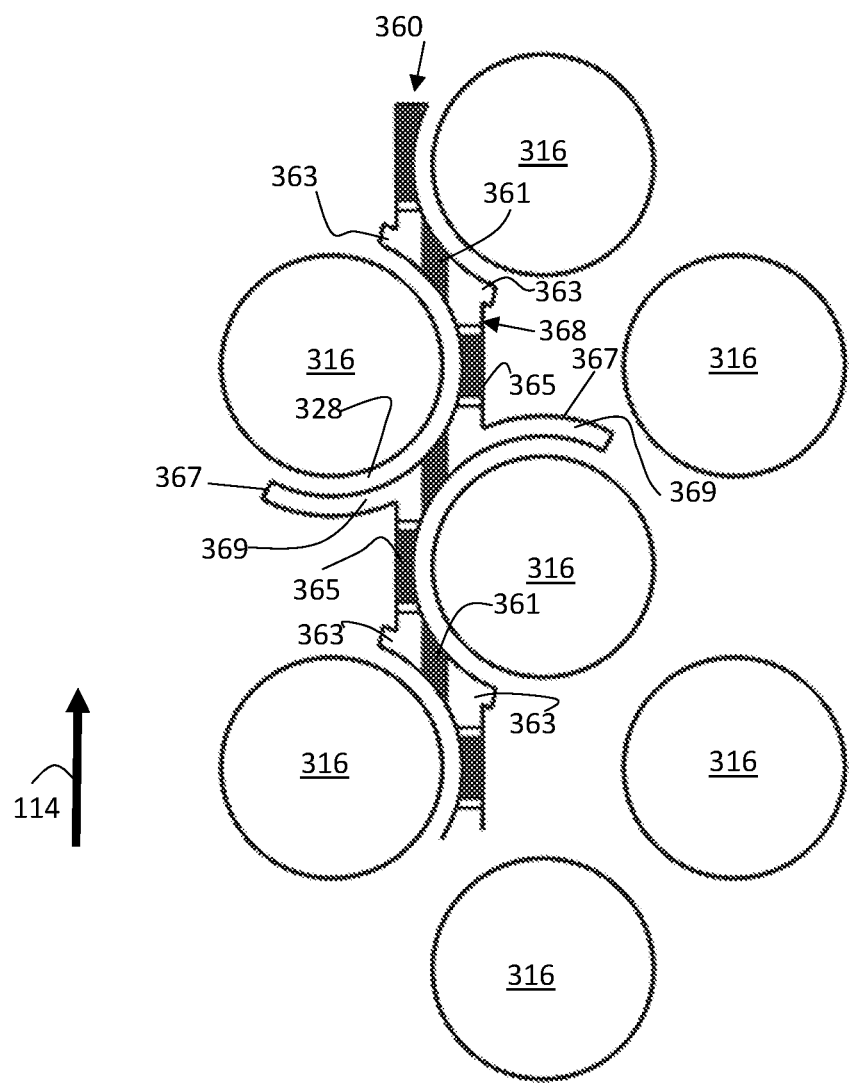
FIG. 9C is a top view of a corrugated vertical wall of the top support plate portion of FIG. 9A.
Figure 9D:
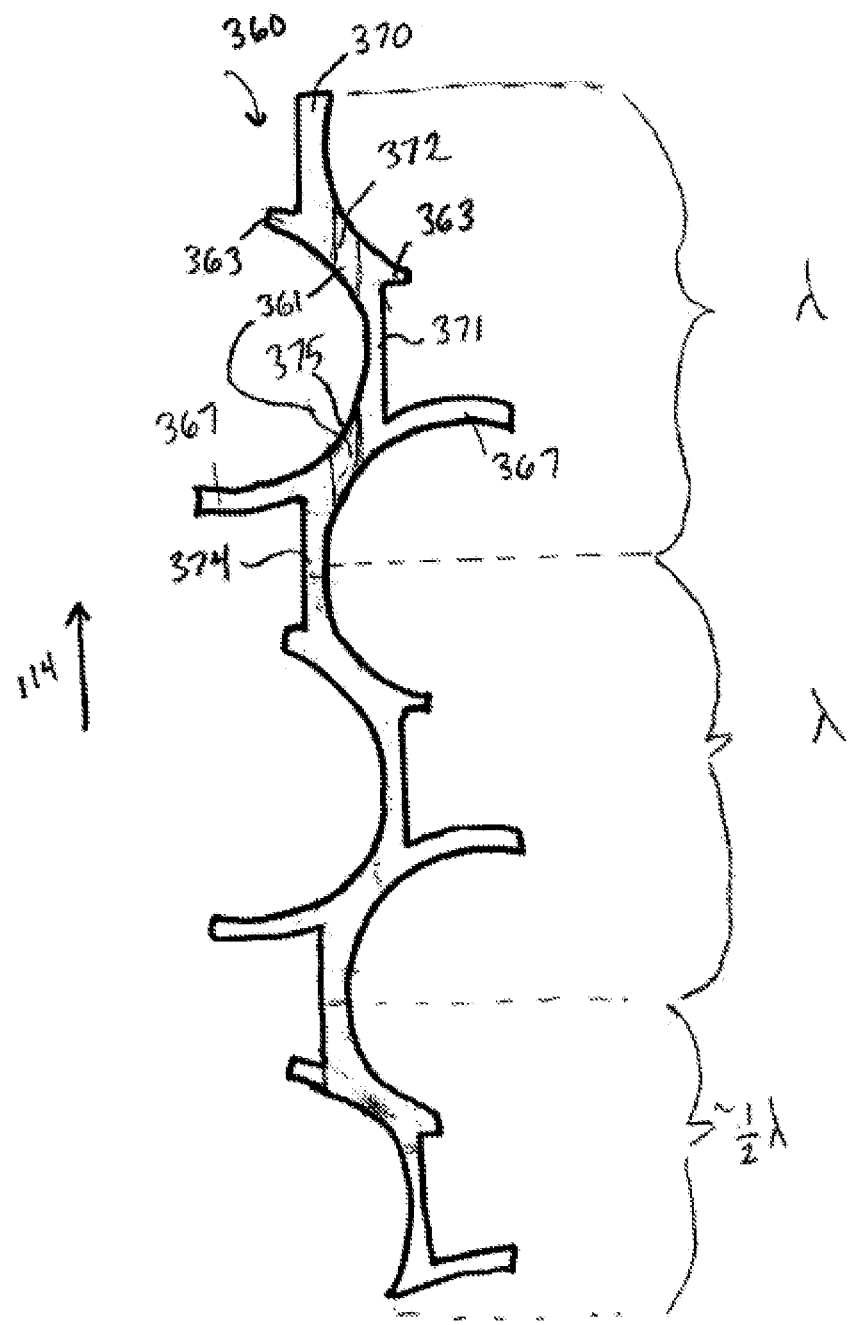
FIG. 9D is another top view of the corrugated vertical wall of FIG. 9C.

As shown in FIG. 9D, the corrugation in the corrugated vertical wall 360 has a wavelength A and pattern that repeats over 2.5 times along the longitudinal length of a top support plate module 320. At a first end, the corrugated vertical wall 360 starts at a first apex 370 and curves to a first trough 371. Shorter gussets 363 extend from the corrugated vertical wall 360 at a first inflection point 373. From the trough 371, the vertical wall curves towards a second apex 374, with curved gussets 367 extending from the corrugated vertical wall at a second inflection point 375. Wearstrip recesses 361 are formed in the top edge at the inflection points 374, 375. Then, the pattern repeats until the end of the top support plate module 320. While the illustrative corrugated vertical wall 360 is continuous along the length of the top support plate 320, alternatively, the corrugated vertical wall 360 may be non-continuous.

The illustrative top support plate 320 further includes fastener openings 386, 387, as shown in FIG. 9A, for receiving fasteners to fasten the top support plate 320 to a bottom support plate 322 and the support frame 400, as described below. In the illustrative embodiment, a corner fastener opening 387 is larger than the other openings 386 to receive a fastener having a bushing, as described below.

Figure 11:
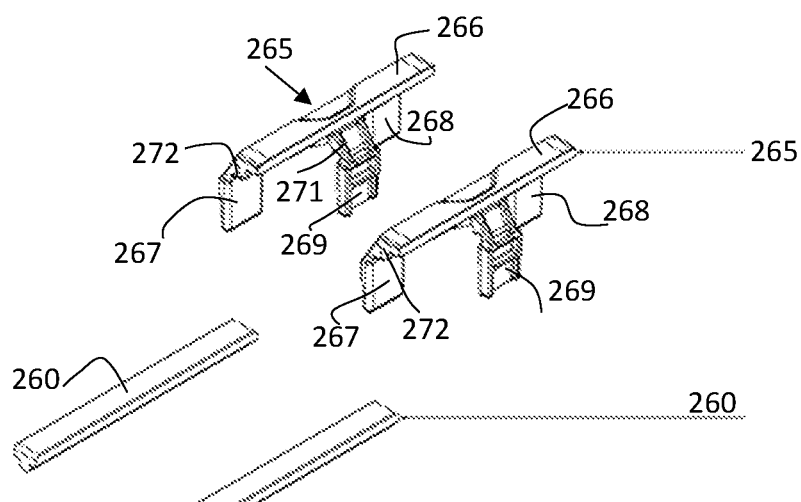
FIG. 11 is a partially exploded view of a section of the drive roller assembly of FIG. 3, showing wearstrips and wearstrip stoppers.
Figure 11:
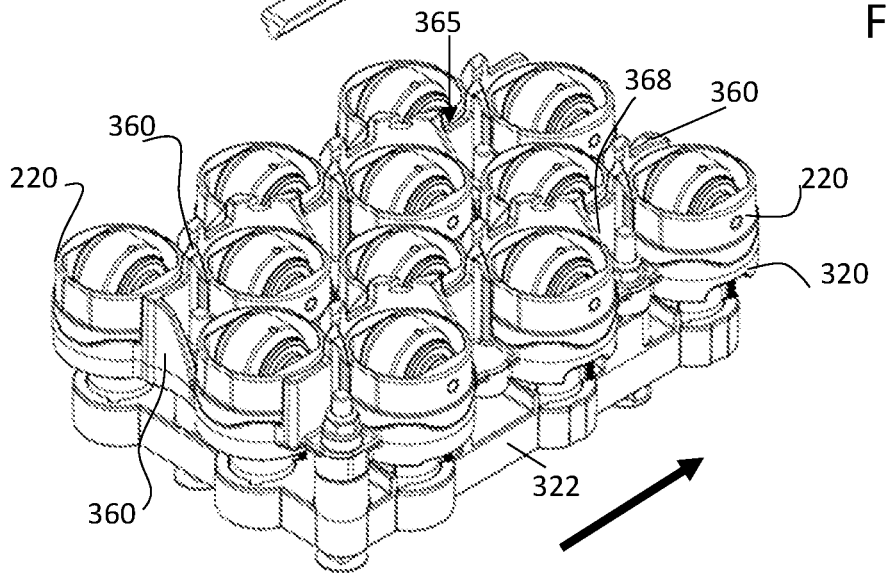
Figure 12:
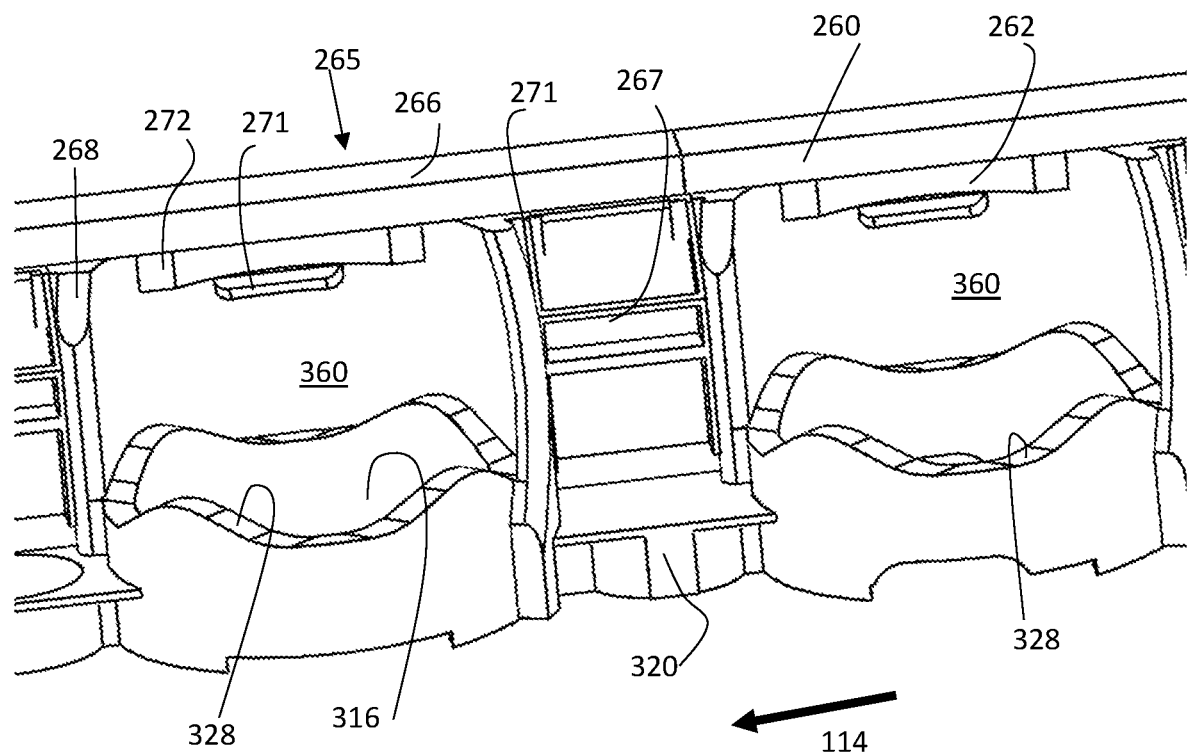
FIG. 12 is an isometric bottom view of the top support plate portion of the drive roller assembly of FIG. 3 with a seated wearstrip and wearstrip stopper.

As shown in FIGS. 11 and 12, a wearstrip stopper 265 can snap into a top support plate 320 at a downstream end of a drive roller assembly to preventing the wearstrip 260 from sliding downstream, with legs received in one or more notches 365. The stopper 265 can be included with each top support plate 320, or selective top support plates, such as the downstream-most top support plate module in a drive roller assembly 200.

The illustrative wearstrip stopper 265 comprises an upper wearstrip portion 266, a pair of legs 267, 268 on a first side of the upper wearstrip portion 266 and an offset leg 269 on a second side of the upper wearstrip portion at the longitudinal middle of the wearstrip stopper 265. The legs 267, 268, 269 each include an upper connecting portion 271 configured to be received in a notch 365 in a corresponding corrugated vertical wall 360. The legs 267, 268, 269 are each received in a vertical slot that is formed between a gusset 363, a flat wall 368 and a curved gusset 367 extending along and down from the notch 365, to lock the wearstrip stopper 265 to the top support plate 320. The upper wearstrip portion 266, which is configured to align with a wearstrip 260 inserted in an upstream portion of a top support plate 320, includes a flange 272 that is received in recesses 361 to place the wearstrip stopper 265 into position. The flange 272 may be shaped to provide clearance for the roller carriers 220. When inserted, the wearstrip stopper 265, as shown in FIG. 12, provides a continuation of the wearstrip surface, while the longitudinal restriction provided by the legs 267, 268, 269 prevents the weight and movement of the conveyor belt from sliding the wearstrip(s) 260 out of place.

Figure 13:
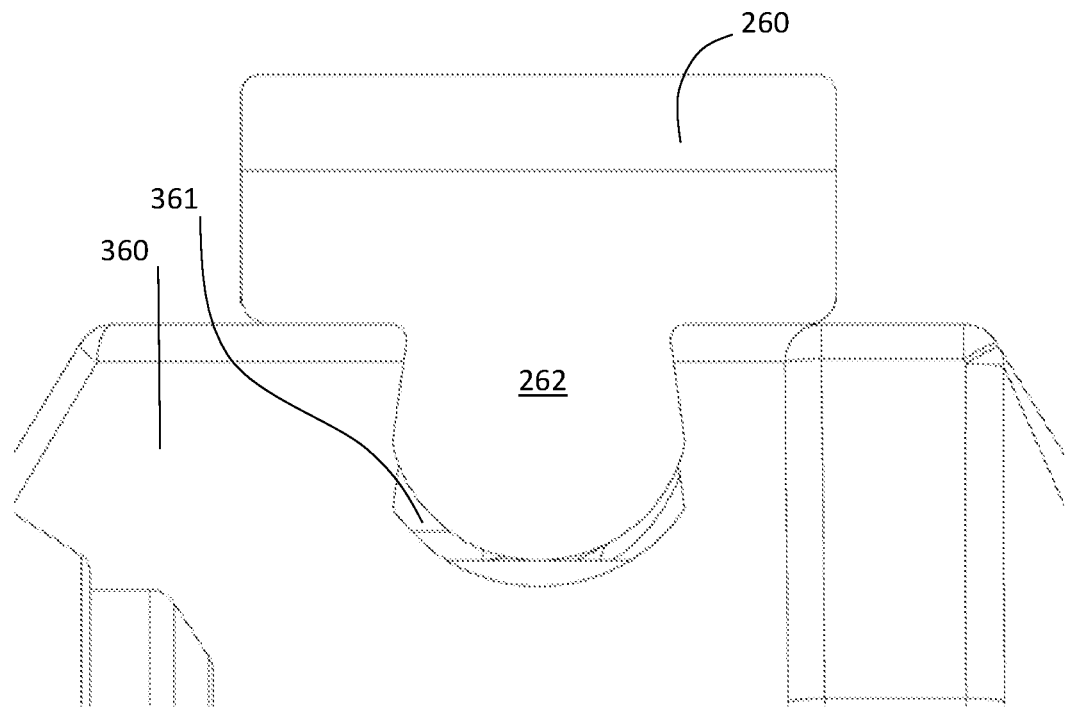
FIG. 13 is a cross-sectional view of a wearstrip seated in a top edge of a top support plate of the drive roller assembly of FIG. 3.

In one embodiment, a wearstrip 260 includes a bulb-shaped protrusion 262 on the bottom surface that is received in recesses 361, via a compression fit, as shown in FIG. 13. The illustrative bulb-shaped protrusion 262 may include straight, diverging sides and a curved, convex bottom surface, but the invention is not so limited. The fit between the protrusion 262 and the recess 361 is designed to have space between the bottom of the protrusion 262 and the bottom of the recess 361, but the invention is not so limited.

The wearstrip 260 may be fabricated as a straight extrusion that may bend slightly to fit in to the recesses 361. For example, the wearstrip-receiving recesses 361 may be slightly offset from each other, to create a serpentine-path, and the wearstrip 260 may bend during insertion to form a serpentine shaped. The serpentine shape in the wearstrip 260 prevents or limits the wearstrip 260 from sliding during operation.

Figure 14:
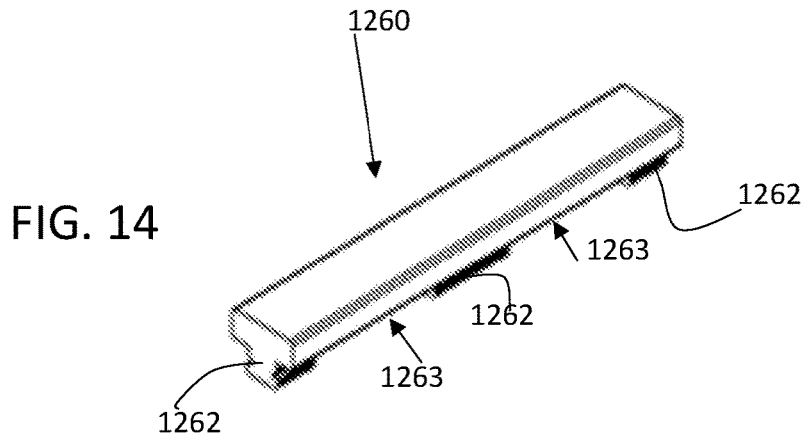
FIG. 14 is an isometric view of a wearstrip for the drive roller system of FIG. 3 having notches to contain the wearstrip.
Figure 15:
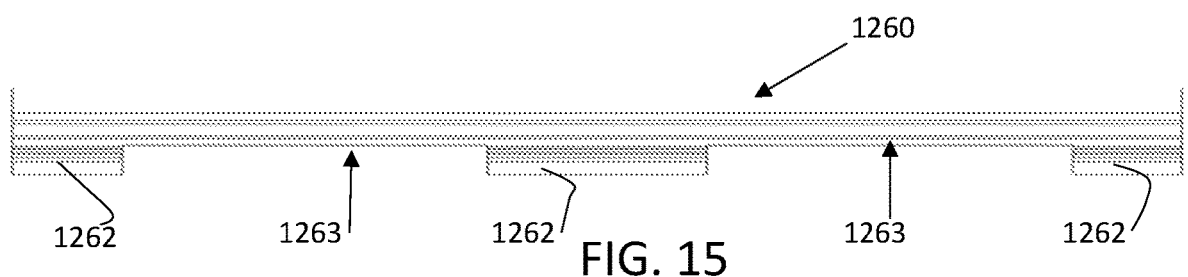
FIG. 15 is a side view of the wearstrip of FIG. 14.

In another embodiment, shown in FIGS. 14 and 15 a wearstrip 1260 includes notches 1263 between protrusions 1262 to provide a geometric lock with the top support plate 320. In the embodiment of FIGS. 14 and 15, the protrusions 1262 have straight sides, side indents and a bottom bulb with curved sides and a flat bottom, but the invention is not so limited.

Figure 16:
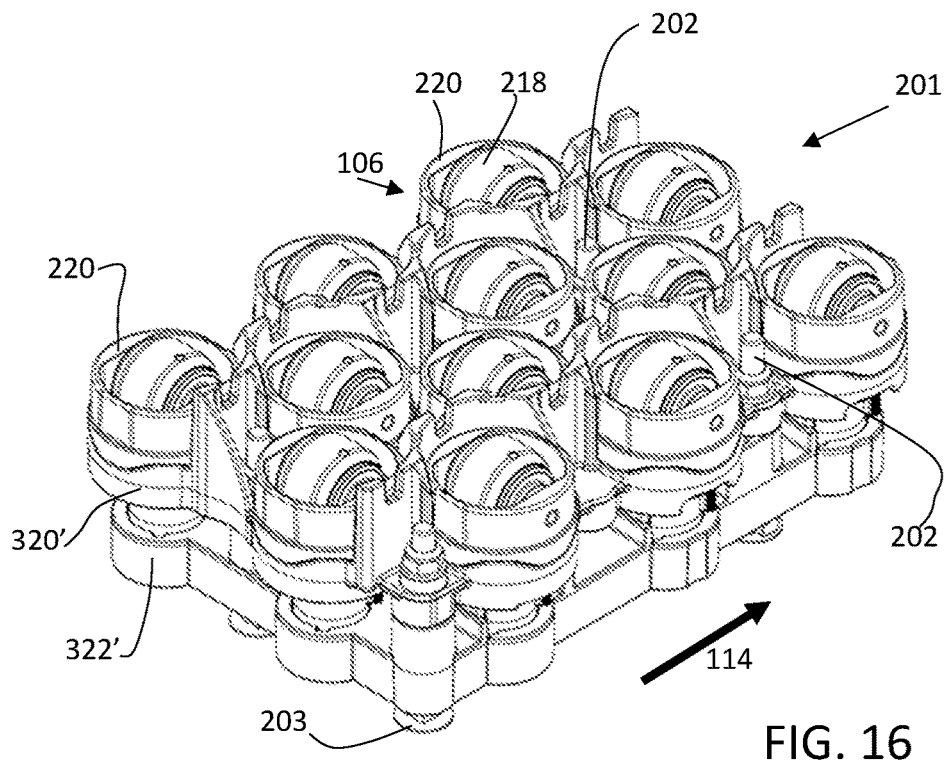
FIG. 16 is an isometric view of a subassembly of the drive roller assembly of FIG. 3.
Figure 17:
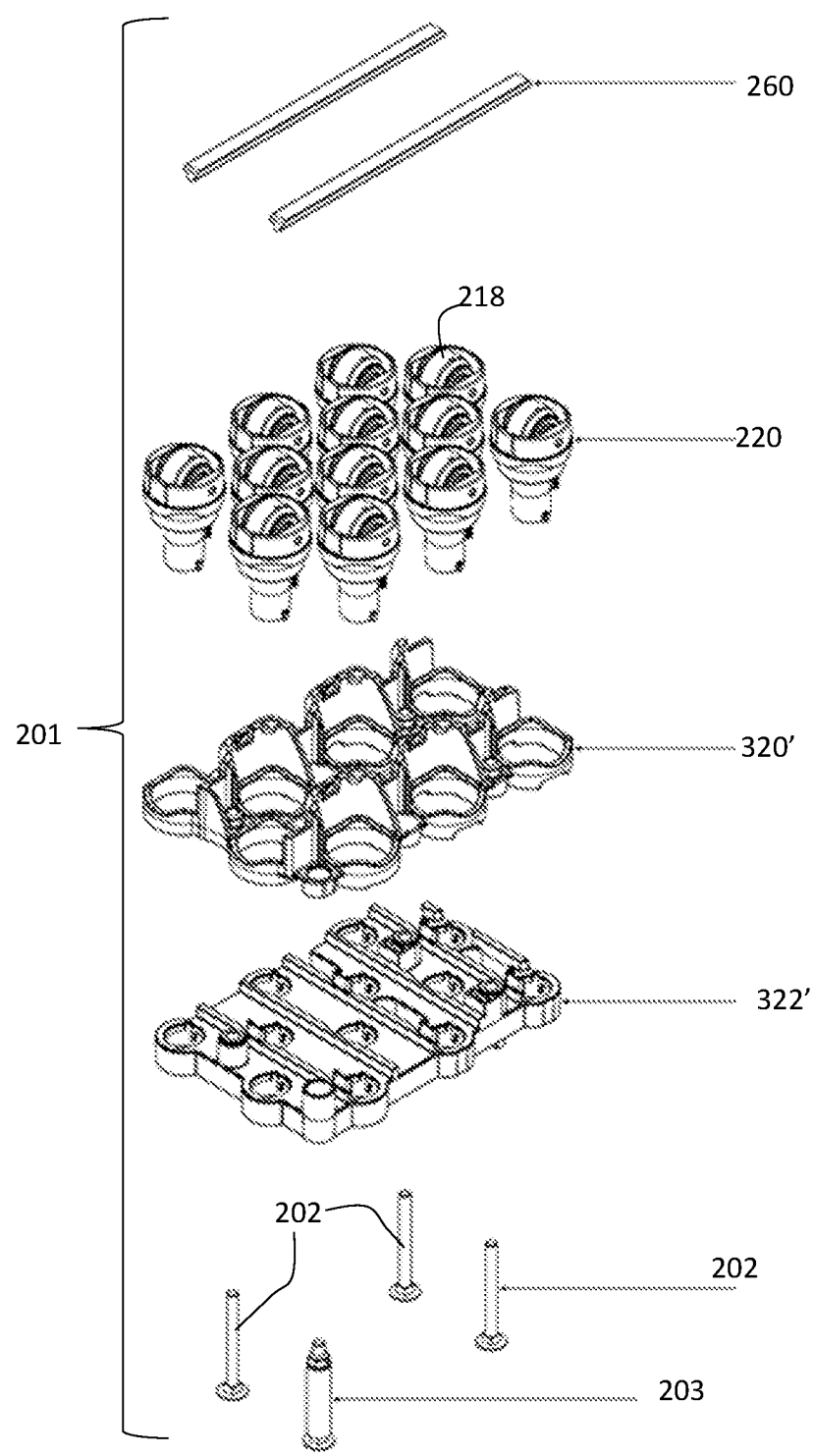
FIG. 17 is an exploded view of the subassembly of FIG. 16.

Referring to FIGS. 16 and 17, a drive roller assembly 200 can comprise a plurality of top support plate modules and bottom support plate modules connected to each other to form a subassembly 201 receiving an array of drive roller modules 106. A number of modular subassemblies 201 can be attached to a support frame 400 as needed to create a drive roller zone 104 with different widths suitable for the configuration of a particular conveyor belt. And, as described above, a number of drive roller assemblies 200 can be used to vary the length of the drive roller zone 104.

Each subassembly 201 can comprise a subarray of drive roller modules 106, each comprising a roller carrier 220 housing a drive roller 218, as described above. Carriage bolts 202 or other fastening devices extending through aligned fastening openings clamp a top support plate module 320' and a bottom support plate module 322' together. An aligning and fastening device 203, which comprises a carriage bolt 202 or other fastener with a metal bushing, is used at one corner of the subassembly to align and anchor the subassembly 201 to the support frame. The aligning and fastening device 203 does not clamp the top and bottom support plates, but rather clamps underlying fastener to the underlying support frame 400. The aligning and fastening device 203 creates a strong metal-to-metal connection to align each sub-assembly 201 along the width of the zone. The alignment slots 402 in the top of the support frame 400 receive the heads of the bolts 202 and 203 to secure the subassembly 201 to the support frame and the components to each other. The orientation device 420 is slidable received between the top and bottom support plate modules 320', 322'.

Figure 18:
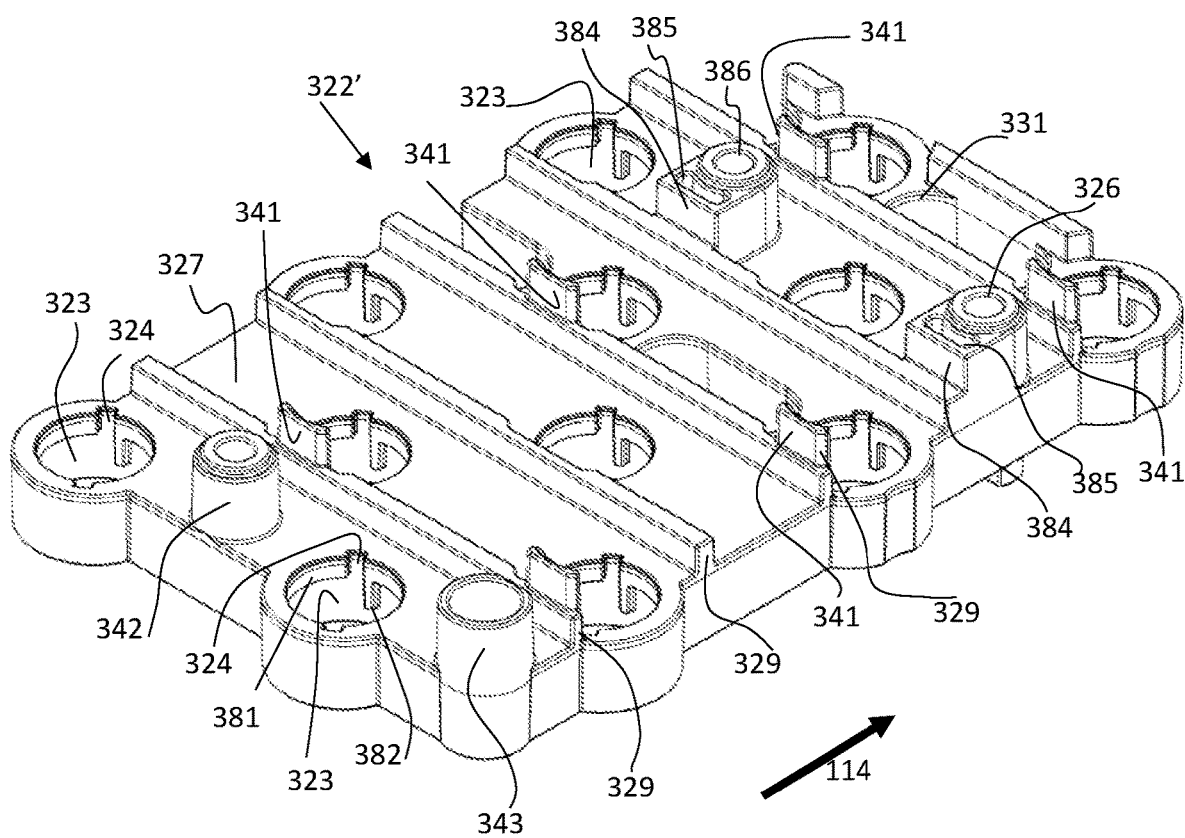
FIG. 18 is a detailed view a bottom support plate of the subassembly of FIG. 16.

Referring to FIG. 18, a bottom support plate module 322' comprises a planar substrate 327 having carrier openings 323 for receiving the lower journal stems 232 of the roller carriers 220. When assembled, the openings are aligned with and below the openings 316 in the top support plate 320. The openings 323 include vertical slots 324 for receiving the tabs 237 on the bottom of the roller carriers 220. The tabs 237 pass through the slots 324 during assembly, then clear a lip 381 rimming the interior of the openings 323. Below the lip 381, the openings 323 provide almost a full circle of clearance to allow the roller carriers 220 to rotate freely within the openings 323, with a stopping protrusion 382 extending down from the lip 381 diagonal from the slot 324. The lip 381 prevents the roller carriers 220 from popping out of the openings 323.

During operation, the travel of the translatable orientation device 420 sheet is restricted by the stroke of the pneumatic actuator 460 so that the tabs 237 and slots 324 cannot align, preventing the roller carriers 220 from exiting the openings 323. Only when the pneumatic actuator 460 is disconnected can the translatable orientation device 420 travel to a "service position" where the roller carriers 220 can be removed by aligning the roller carrier tabs 237 and bottom plate slots 324 and pulling the roller carriers 220 vertically.

Vertical buttresses 326 extend from, and can be integrally molded with, the top of the planar substrate 327 and include openings for fasteners 202. The illustrative buttresses 326 provide vertical support for the top support plate 320. The illustrative buttresses 326 include flat vertical end faces 384 forming wear surfaces that contact and guide the translatable orientation device 420. When assembled, the buttresses 326 extend between the two orientation plates 420a, 420b. The illustrative buttresses 326 further resist, reduce and-or prevent gear separation forces that may be present in the system. The illustrative buttresses 326 include manufacturing recesses 385 for maintaining substantially uniform wall thickness throughout the feature to ease moldability, but the invention does not require these recesses 385 or the other shown features.

The bottom support plate 322 further includes a vertical boss 342 having another fastener opening for a fastener 202 and an alignment boss 343 in a corner having a larger opening for the aligning and fastening device 203. The vertical boss 342 and alignment boss 343 are formed along a laterally-extending edge of the bottom support plate, which may be the upstream edge, but could alternatively be the downstream edge of the module. The bottom plate module 322' further includes guidance features 341, which may also be integrally molded with the planar substrate 327. The guidance features 341 extend up from a side of at least some openings 323 and constrain the motion of the translatable orientation device 420.

In addition, the illustrative bottom support plate 322 includes lateral rails 329 providing additional vertical support for the translatable orientation device 420. The illustrative rails 329 contact the translatable orientation device 420 in locations lacking gear teeth or other laser-cut features to prevent wearing of the lateral rails. The space between the lateral rails 329 allows some debris to fall through without gumming up the motion of the translatable orientation device 420.

Figure 19:
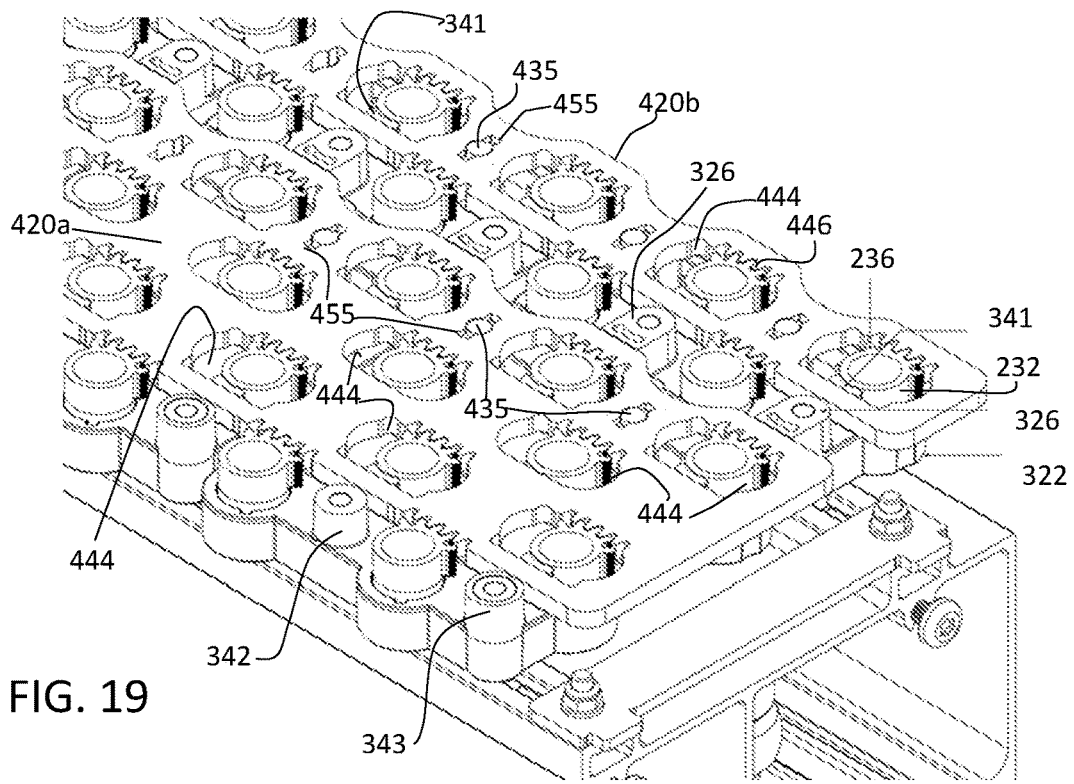
FIG. 19 is an isometric top view of a portion of the subassembly of FIG. 16.

Referring to FIG. 19, the illustrative translatable orientation device 420 comprises a main plate 420a and a minor plate 420b. The orientation plates 420a, 420b are slidably sandwiched between the fixed upper support plate 320 and the bottom support plate 322, both of which, as described above, can comprise a plurality of modules. Each orientation plate 420a, 420b is positioned to engage the teeth 236 of the roller carriers 220 to form a rack-and-pinion system that can rotate the roller carriers 220 in unison as the orientation plates 420a, 420b are translated by the actuator 460. The orientation plates have orienting openings 444 elongated in the lateral direction. The elongated orienting openings 444 are bounded on one side by a linear array of teeth 446 forming a rack gear. Each elongated orienting opening 444 is positioned below one of the roller carrier openings 316 in the top support plate 320, so each elongated opening 444 can receive a lower journal stem 232 of a roller carrier 220. When the roller carriers are inserted, the lower journal stem 232 extends through the elongated orienting openings 444 in the orientation plate and into the smaller carrier openings 323 in the bottom support plate 322 below. Laterally-extending edges of the orientation plates 420a, 420b, shown as the upstream edges, also include teeth and are positioned to accommodate and engage selected roller carriers 220 in the array.

Figure 20:
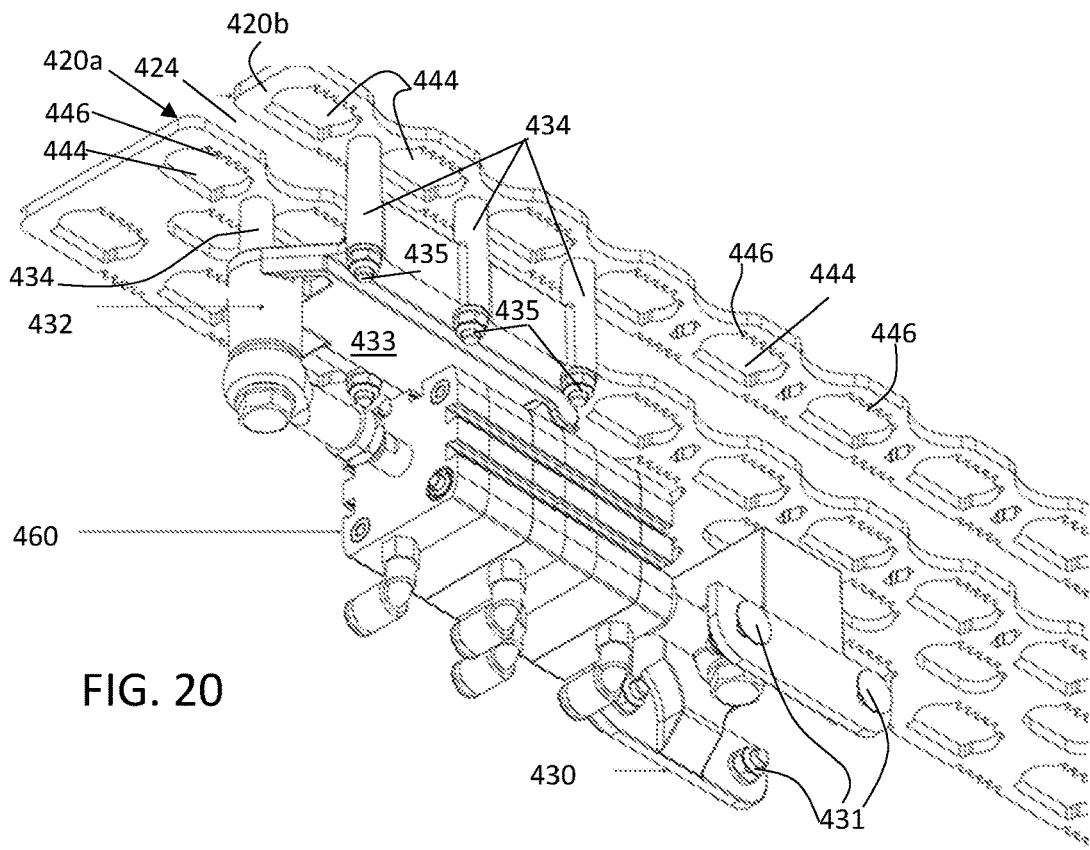
FIG. 20 is a bottom view of the translatable orientation plates, clevis connectors and actuators of the subassembly of FIG. 16.

As shown in FIG. 20, the main plate 420a and minor plate 420b are separated by a space 424 to accommodate the row of vertical buttresses 326 extending from the bottom support plate 322, with a row of roller carriers received and housed in the space 424, as shown in FIG. 19. The main plate 420a has an end edge that is inset from the end edge of the bottom support plate 320 to accommodate bosses 342, 343, so that when assembled, as shown in FIG. 19, the bosses 342 and 342 are adjacent the laterally-extending outer edge of the main plate 420a.

In addition, the illustrative guidance features 341 on the bottom support plate 322 are configured to extend between a non-toothed side of an elongated orienting opening 444 and the lower journal stem 232 of a roller carrier 220. The flat side of each guidance feature 341 contacts the inside edge of the corresponding elongated orienting opening 444. These faces provide wear surfaces and resist any gear separation forces in the system. The lack of teeth on that portion of the lower journal stem 232 enables inclusion of the guidance features 341.

As shown in FIG. 20, the orientation plates 420a, 420b are translated by a linear actuator 460, such as an air cylinder. One end of the actuator 460 is attached to the static actuator clevis 430, which connects the fixed rod eye of the actuator 460 to the support frame 400. The illustrative static actuator clevis 430 includes four fasteners 431 that engage T-slots 461, 462 along the inside of the support frame 400. The fasteners can be tightened during assembly to connect the static actuator clevis 430 to the support frame 400. At the other end, the moving actuator clevis 432 connects the actuator 460 to the orientation plates 420a, 420b. The moving actuator clevis 432 includes a plate 433 and a plurality of bosses 434 receiving fasteners 435 to connect to both orientation plates 420a, 420b to join the orientation plates together and allow them to operate in unison.

Referring back to FIG. 19, the fasteners 435 extend through openings 455 in the orientation plates to secure both orientation plates 420a, 420b to the moving actuator clevis 432 and each other. Referring back to FIG. 18, the bottom support plate 322 includes clearance slots 331 configured to allow passage of the fasteners 435, which slide within the clearance slot 331. As described above, the support frame 400 also includes clearance slots 405 for the fasteners 435 to enable sliding of the translatable orientation device 420.

Figure 21:
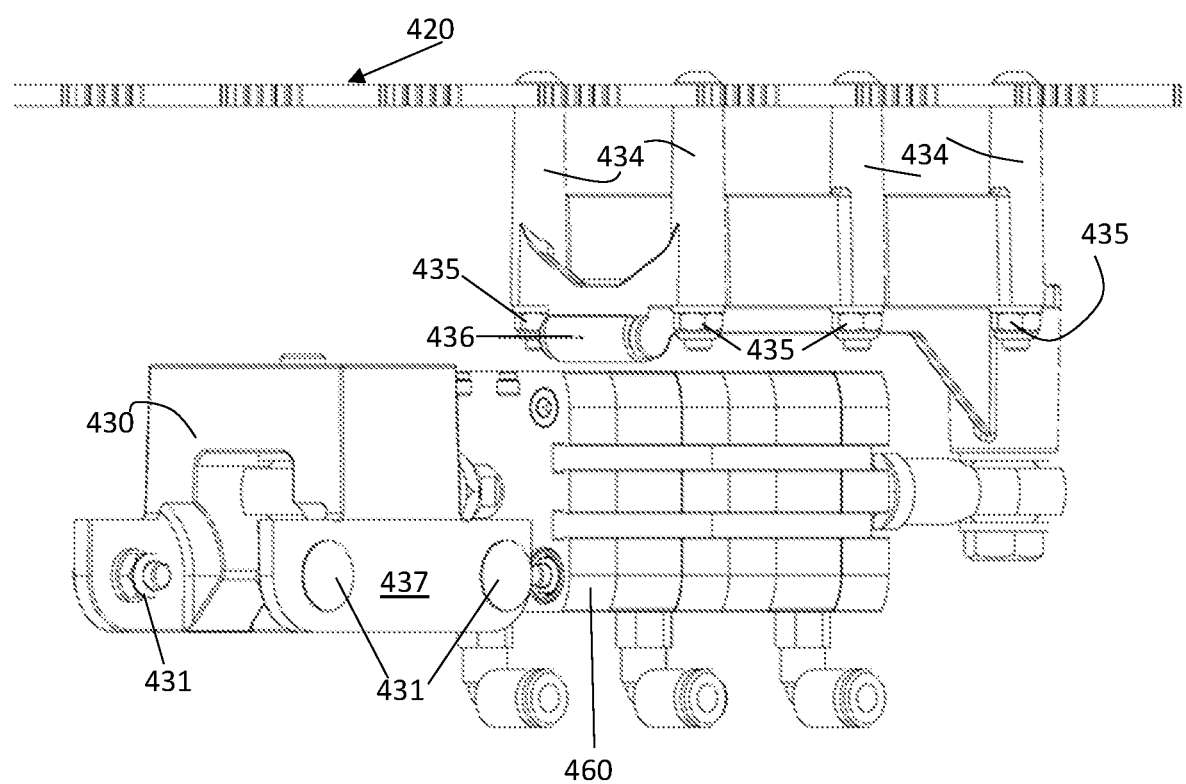
FIG. 21 is an isometric side view of the translatable orientation plates, clevis connectors and actuators of the subassembly of FIG. 16.

Referring to FIGS. 21, in one embodiment, the moving actuator clevis 432 may include a glide 436 on a bottom surface thereof. The illustrative glide 436 is formed of UHMW or another low-friction material to prevent the actuator 460 from rotating and reducing friction between the actuator 460 and moving actuator clevis 432. In another embodiment, the outer surfaces 437 of the static actuator facing the slots 461, 462 of the support frame 400 may include cross-hatching, knurling or have another feature to increase the grip between the support frame 400 and the static actuator 430.

Figure 22:
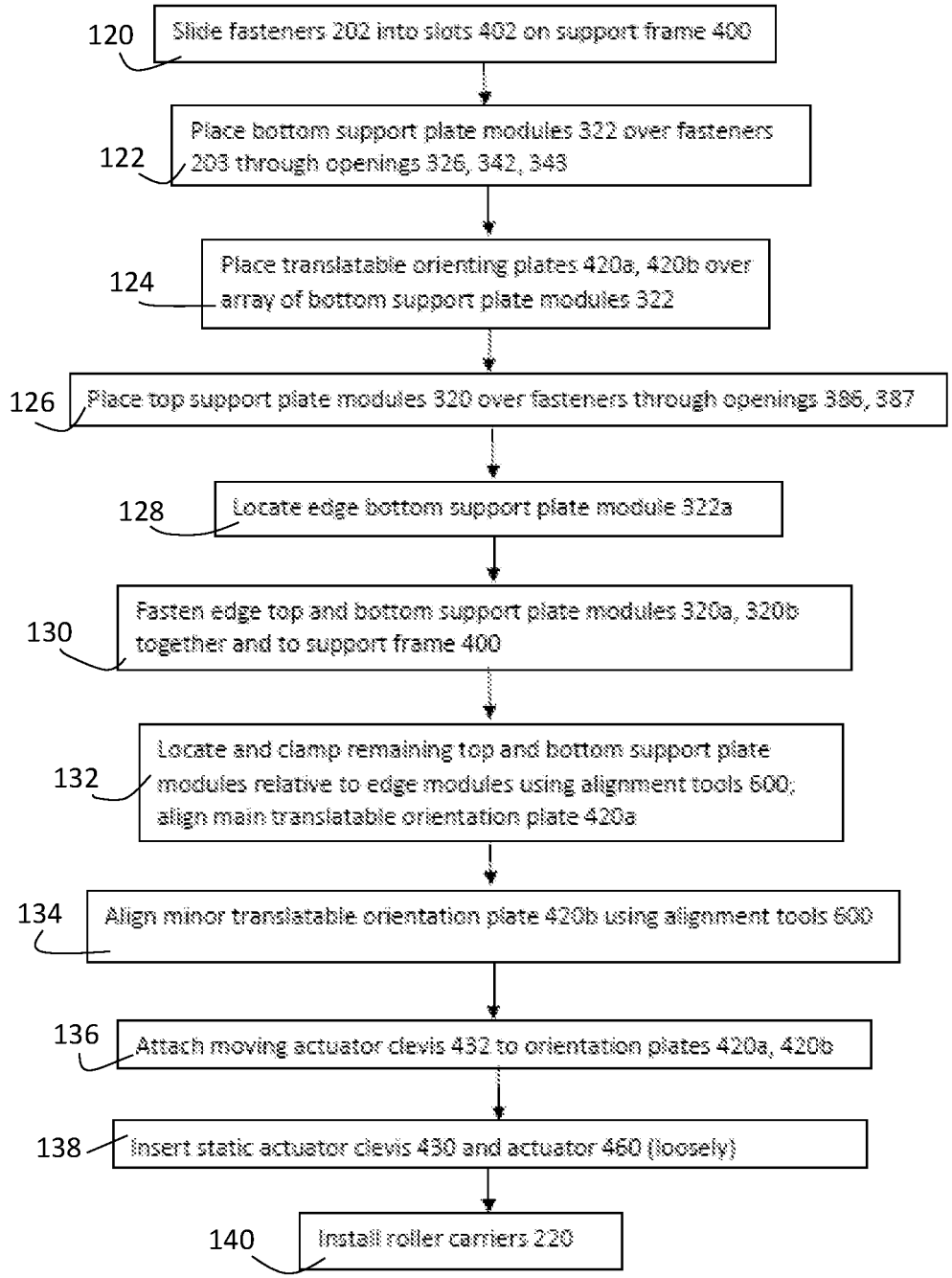
FIG. 22 is a flow chart detailing the steps involved in assembling a drive roller assembly according to an embodiment of the invention.
Figure 23:
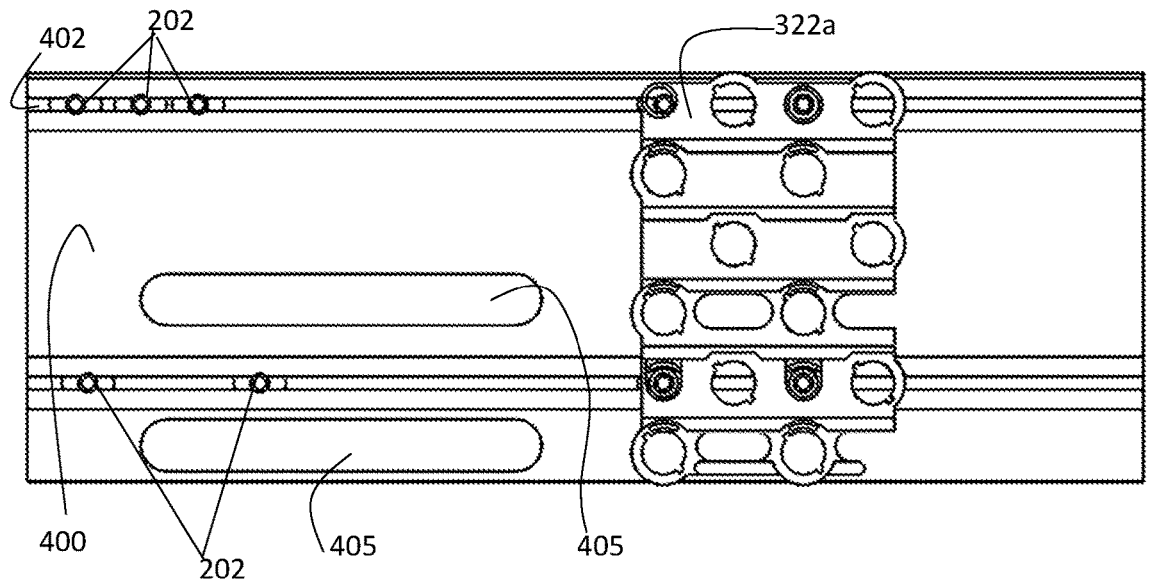
FIG. 23 is a top view of a drive roller assembly during an initial assembly step of the steps shown in FIG. 22.
Figure 24:
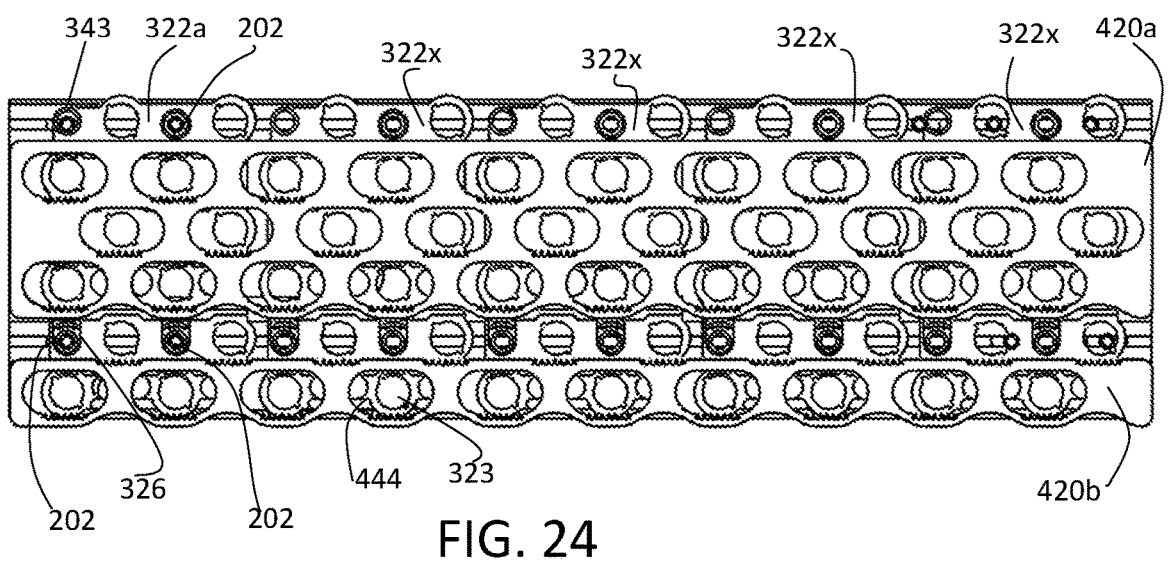
FIG. 24 is a top view of the drive roller assembly of FIG. 23 after placing translatable orientation plates over an array of bottom support plate modules.

FIG. 22 shows a method of assembling a drive roller assembly 200 including modular top and bottom support plates. First, in step 120, fasteners 202 are slid into the support frame slots 402, such that the slots 402 retain the fastener heads and the fastener shank extend up, as shown in FIG. 23. The number of fasteners 202 depends on the number of top and bottom support plate modules to be used, with four fasteners per top and bottom support plate module Then, in step 122, a first bottom support plate module 322*a* is mounted over a first set of fasteners, as shown in FIG. 23. Successive bottom support plate modules 322*x* are similarly mounted over successive sets of fasteners in a similar manner, until a desired width is achieved. In step 124, translatable orienting plates 420*a*, 420*b* are placed over the bottom support plates modules, as shown in FIG. 24. As shown in FIG. 24, the translatable orienting plates 420*a*, 420*b* are placed over the array of bottom support plate modules so that each elongated opening 444 is over an opening 323, bosses 326 with fasteners 202 extend between the main plate 420*a* and minor plate 420*b* and bosses 342, 343 abut the upstream lateral edge of the main plate 420*a*.

Then, in step 126, the top support plate modules 320*a*-320*x* are mounted by inserting each set of fasteners 202 through openings 386 and 387, with opening 387 overlying and aligned with opening 343 of an underlying bottom support plate module 322.

In step 128, an edge bottom support plate module 322*a* is located in a precise position relative to the edge of the support frame 400. The positioning may be done using a tool that engages an edge of the bottom support plate, markings or another method.

In step 130, the edge top and bottom support plate modules 320*a*, 322*a* are fastened together and to the support frame by tightening nuts around three fasteners 202, inserting a bushing over a corner fastener to form the alignment device 203 and tightening the fastener to a higher torque than the fasteners 202 alone.

Figure 25:
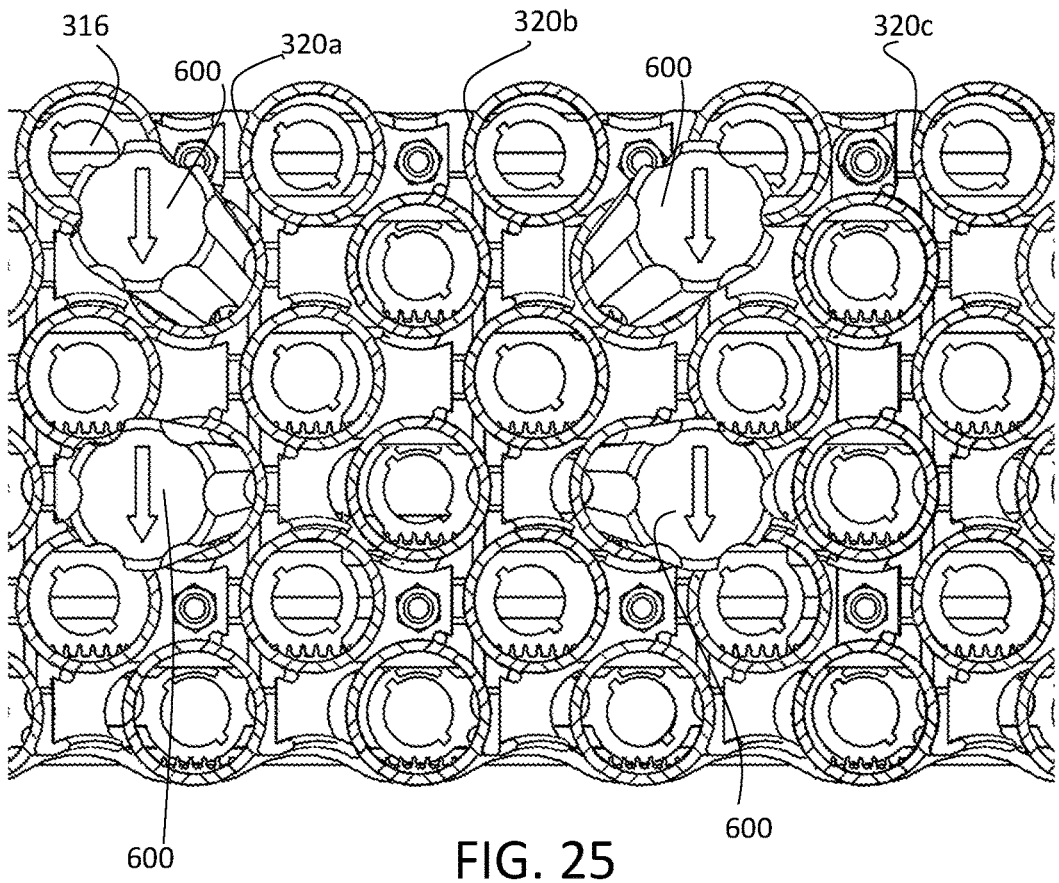
FIG. 25 is a top view of the drive roller assembly of FIG. 24 after mounting an array of top support plate modules and during alignment of the components of the drive roller assembly relative to each other.

In step 132, the remaining top and bottom support plate modules are located relative to the edge top and bottom support plate modules and the main translatable orientation plate 420*a*. In one embodiment a plurality of alignment tools 600 are used to locate the remaining top and bottom support plate modules relative to the edge modules, as shown in FIG. 25. The illustrative method employs four alignment tools: two that are inserted into edge top and bottom support plate modules 320*a*, 322*a* and the intermediate main orientation plate 420*a* and two that are inserted into each successive top and bottom support plate module being aligned with the edge modules and the intermediate main orientation plate 420*a*. After each set of modules is located and clamped using nuts on the fasteners 202, the second set of alignment tools is inserted into a successive set of modules until all modules 320, 322 are clamped together and to the underlying support frame 400 and the main orientation plate 420*a* is in position relative to the top and bottom support plate modules.

Figure 26:
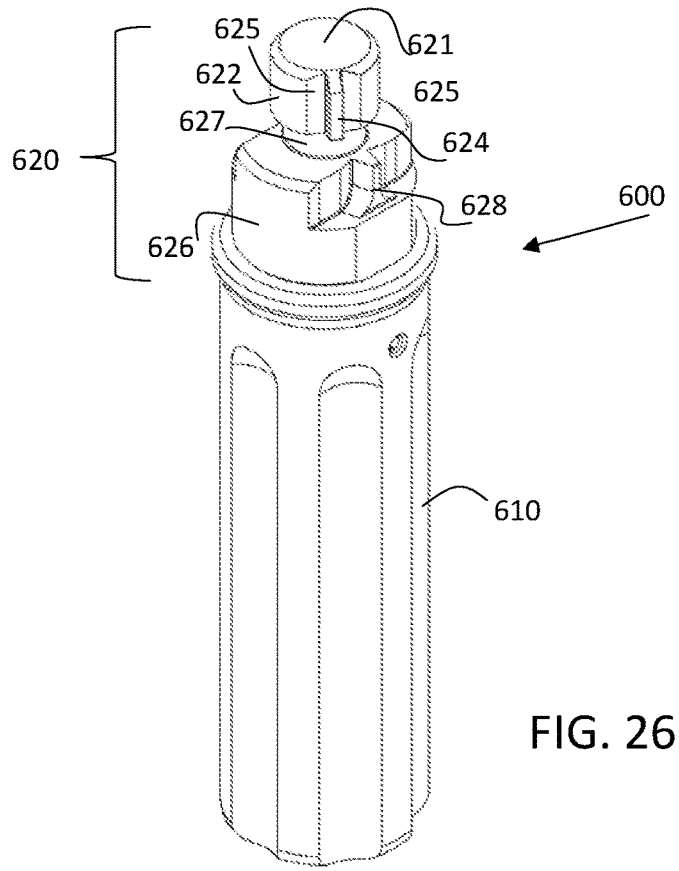
FIG. 26 is an isometric view of an alignment tool used during assembly of the drive roller assembly of FIG. 25.

FIG. 26 is an isometric view of an alignment tool 600 suitable for use in aligning components of the drive roller assembly relative to each other during assembly. The alignment tool 600 includes a handle 610 and a head 620 configured to be received in an opening 316 of a top support plate, an elongated opening 444 of an orientation plate 420 and an opening 323 of an underlying bottom support plate and to precisely align the openings 316, 444, 323. The head 620 comprises a top knob 621 that fits in the bottom opening 323. The top knob 621 is substantially cylindrical, with a round perimeter wall 622 and a rectangular protrusion 624 extending from angled, converging flat walls 625. The protrusion 624 is configured to be received in the vertical slots 324 of the bottom support plate 322 that receive the tabs 237 on the bottom of the roller carriers 220. The top knob 621 is connected to the head base 626 by a neck 627. The base 626 is configured to be received in and engage the elongated opening 444 of an orientation plate. The base 626 includes rounded sides, flat front and end walls and a tapering protrusion 628 configured to engage a central tooth 446 of the opening 444 to precisely position the orientation plate 420 relative to the bottom support plate. When inserted, the alignment tools 600 maintain the position of assembly components together until the fasteners 202 can be fastened, securing the top support modules and the bottom support plate modules to each other and to the underlying support frame 400.

Figure 27:
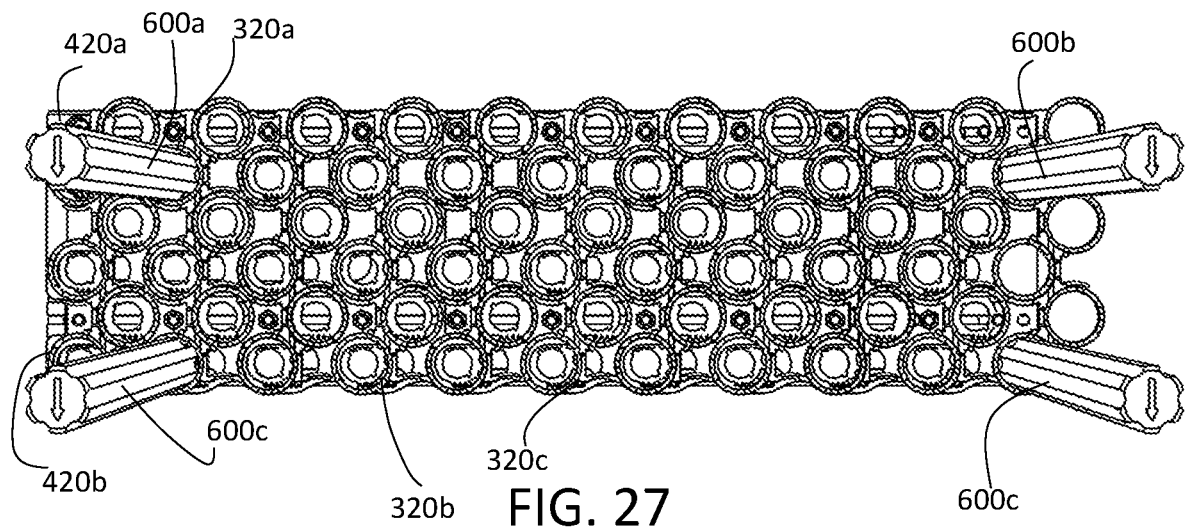
FIG. 27 is a top view of the drive roller assembly of FIG. 25 during alignment of a minor translatable orientation plate.

Then, in step 134, the minor orientation plate 420*b* is aligned with the other components. In this step, as shown in FIG. 27, the lower two alignment tools 600*c*, 600*d* are moved to openings 316 over the minor alignment plate 420*b*, with two alignment tools 600*a*, 660*b* remaining engaged with the main alignment plate 420*a*, to align and locate the minor alignment plate 420*b* relative to the other components. As shown, the alignment tools 600*a*-*d* are located near the edges of the assembly during this step.

Figure 28:
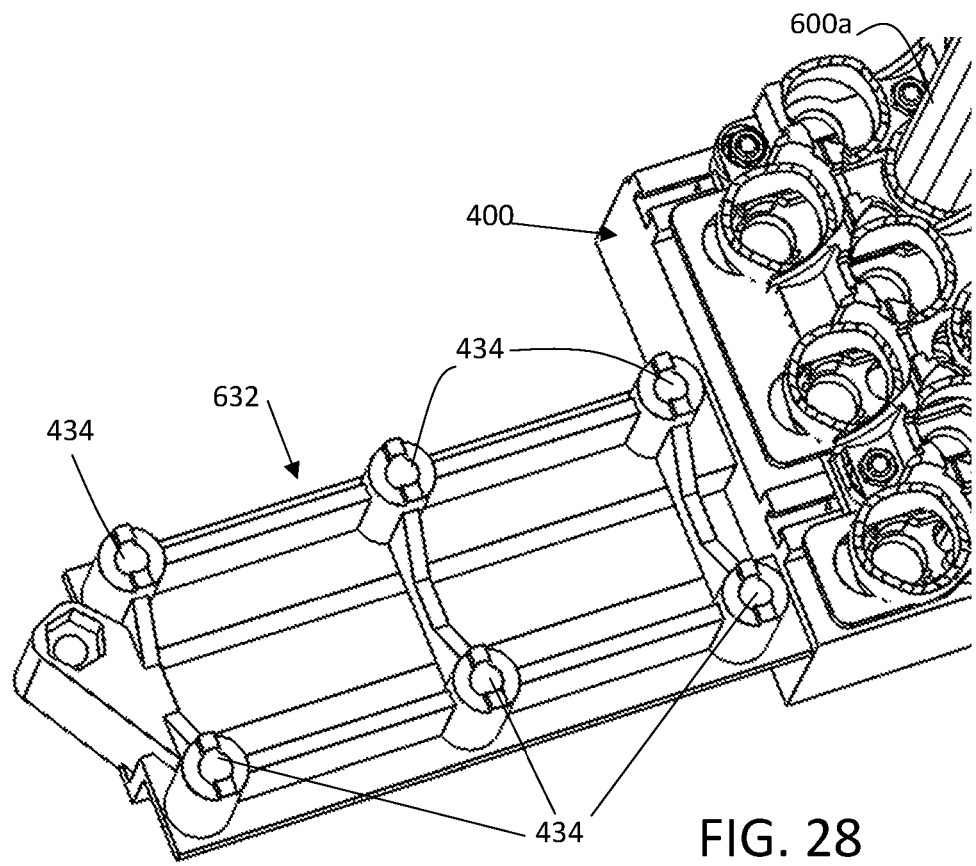
FIG. 28 is an isometric top view of the drive roller assembly of FIG. 27 during attachment of a moving actuator clevis to the translatable orientation plates.

In step 136, the moving actuator clevis 432 is installed and attached to the translatable orientation plates 420*a*, 420*b*. As shown in FIG. 28, while the alignment tools 600 are still inserted, the moving actuator clevis 432 is slid into the channel of the support frame 400, so that the bosses 434 align with the clearance slots 405 of the support frame, the clearance slots 332 of the bottom support plate modules and the openings 455 of the orientation plates 420*a*, 420*b*. Fasteners 435 can then be inserted through aligned slots and openings and tightened to secure the moving actuator clevis 432 to the orientation plates 420*a*, 420*b* and the orientation plates 420*a*, 420*b* to each other.

Next, in step 138, the actuator 460 and static actuator clevis 430 are inserted in the channel of the support frame and mounted loosely using fasteners, without fully fastening the components together. The actuator 460 can then be tested to see if it properly diverts the translatable orientation plate.

Figure 29:
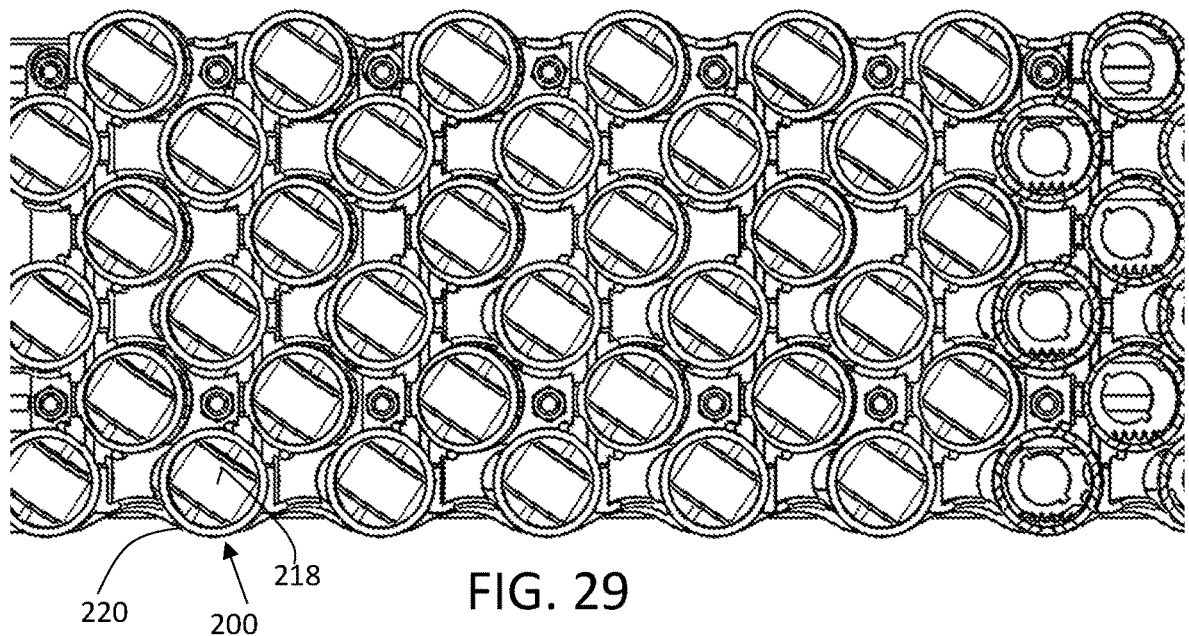
FIG. 29 is a top view of the drive roller assembly of FIG. 28 during insertion of an array of drive roller modules.

In a subsequent step, step 140, the roller carriers 220 are installed the assembly in step 140. In this step, the static actuator, though loosely mounted, is unconnected to the cylinder of the actuator. The translatable orientation sheets 420*a*, 420*b* are manually pushed to a far left or right "service" position, exposing the vertical slots 324 in the bottom plates 323. The roller carriers 220 with drive rollers 218 can then be inserted through the openings 316, 444 and 323, as shown in FIG. 29. After all the roller carriers 220 and drive rollers 218 are inserted, the translatable orientation sheets 420*a*, 420*b* are moved to a center position, and the static actuator clevis 432 is firmly attached to the actuator 460 using a bolt or other suitable fastener. Wearstrips 260 can be inserted in the wearstrip holders formed by the corrugated vertical walls in the top support plate. The wearstrips 260 can be inserted before or after roller assemblies 220. The drive roller assembly 200 is then ready to selectively move the drive rollers 218 between diverting positions and a non-diverting position to selectively divert objects on a conveyor belt running over the drive roller assembly 200.

Figure 30:
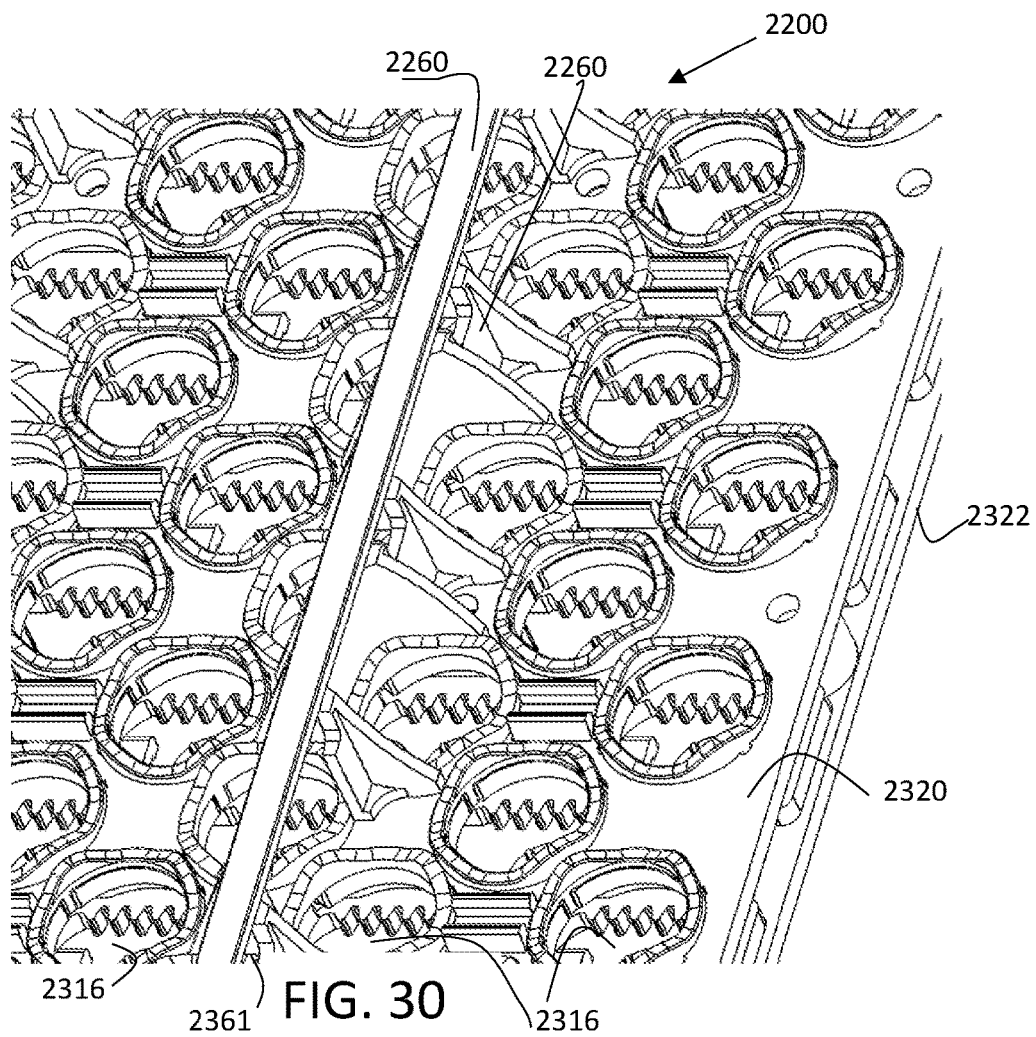
FIG. 30 is an isometric top view of a portion of a drive subassembly including a corrugated insert for retrofitting the drive assembly with wearstrips according to another embodiment.

According to another embodiment, the corrugated vertical walls of the top support plate 320 may be separate from a main portion of the top support plate to allow retrofitting, replacement and-or cleaning of the corrugated vertical walls, or for another purpose. For example, as shown in FIG. 30, a drive roller assembly 2200 may include a bottom support plate 2322 and a top support plate 2320 including openings 2316 for roller assemblies (not shown, but similar to identical to the roller assemblies 220 or 520 described above). A corrugated insert 2360 is inserted between two columns of openings 2316, at selected lateral intervals, and includes shaped recesses 2361 in upper edges of the corrugated insert configured to hold a wearstrip 2260.

FIGS. 31 and 32 show an embodiment of a corrugated insert 2300 that may be used with a drive roller assembly to allow the drive assembly to incorporate wearstrips. The illustrative corrugated insert 2300 includes a base 2362, two columns of offset openings 2317 configured to overlap openings of an upper support plate 2320 and a corrugated vertical wall 2360 between the columns. The illustrative openings 2317 include camming surfaces 2328 for selectively raising and lowering a drive roller carrier received in an opening 2317 during pivoting of the drive roller carrier about a vertical axis. The corrugated vertical wall 2360 includes top recesses 2361 for receiving a wearstrip 2260. The other features of the corrugated vertical wall 2360, such as gussets and slots, may be similar to the corrugated vertical wall 360 described above. The corrugated insert 2300 may include connectors, shown a bottom protrusions 2368, for connecting the corrugated insert 2300 to a top support plate to integrate wearstrips into a drive assembly. Other suitable means for integrating the corrugated insert 2300 may be used.

Figure 33:
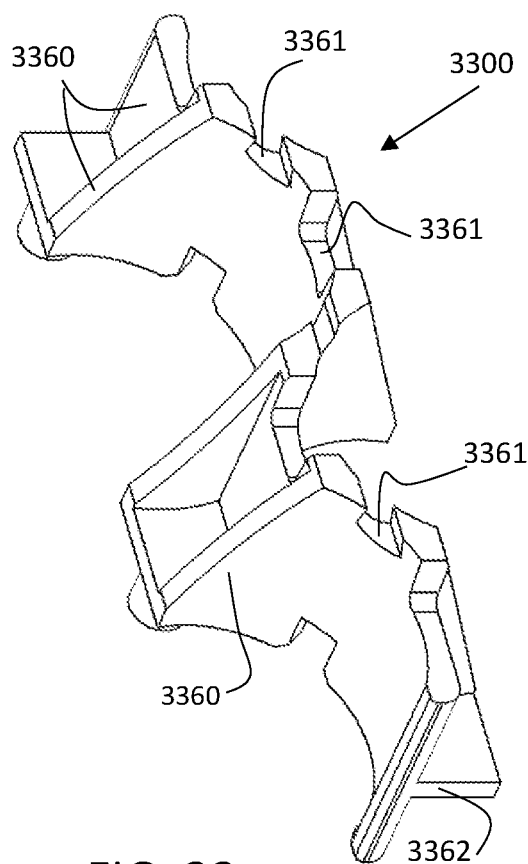
FIG. 33 is an isometric top view of a corrugated insert according to another embodiment.
Figure 34:
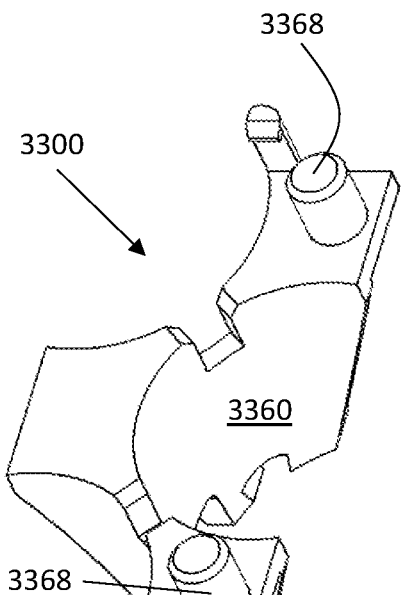
FIG. 34 is an isometric bottom view of the corrugated insert of FIG. 33.
Figure 35:
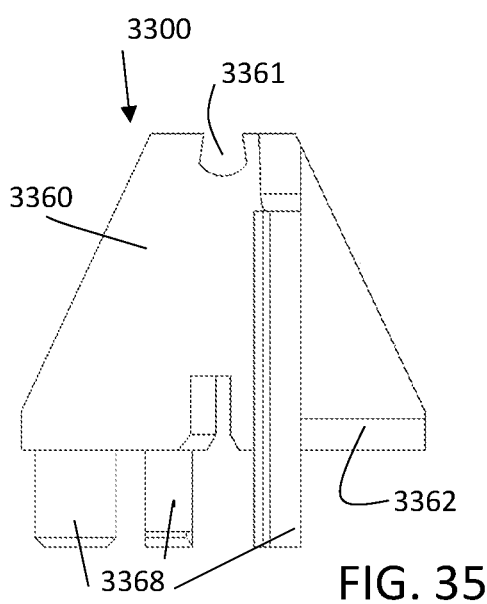
FIG. 35 is a side view of the corrugated insert of FIG. 33.

FIGS. 33-35 show another embodiment of a corrugated insert 3300 for a drive assembly to enable insertion of wearstrips across a width of the drive assembly. The corrugated insert 3360 includes a base 3362 from which a corrugated wall 3360 extends. The corrugated wall 3360 includes upper recesses 3361 for seating a wearstrip. The illustrative insert 3300 does not entirely circumscribe the openings 2316 of the upper support plate 2320, but the invention is not so limited. The insert 3300 further include insertion tabs 3368 extending from the bottom of the base 3362 for connecting the corrugated insert 3300 to a top support plate to integrate wearstrips into a drive system. Gussets, slots and other features may also be included, as described above.

FIGS. 36 and 37 show another embodiment of a corrugated insert 3400 suitable for use with a drive roller assembly 2200. The corrugated insert 3400 comprises a corrugated vertical wall 3360 extending from a first end to a second end and having curves that partially circumscribe openings in adjacent columns of an upper support plate 2320 of an underlying drive roller assembly 2200. The illustrative insert 3400 includes one or more circular rims extending from the vertical wall 3360 defining openings 3417 that overlap openings 2316 of an upper support plate 2320. The openings 3417 can include camming surfaces for selectively raising and lowering a drive roller, replacing selected camming surfaces in the upper drive plate, as described above. The corrugated vertical wall 3460 includes top recesses 3461 for receiving a wearstrip. Curved gussets 3467 extend tangentially to the corrugated wall 3460 to provide additional support and fit between features of the upper support plate of an underlying drive roller assembly that employs the insert 3400. The corrugated insert 3400 may include connectors, shown a bottom protrusions 3468, for connecting the corrugated insert 3400 to a top support plate to integrate wearstrips into a drive assembly. Other suitable means for integrating the corrugated insert 3400 may be used.

Figure 38:
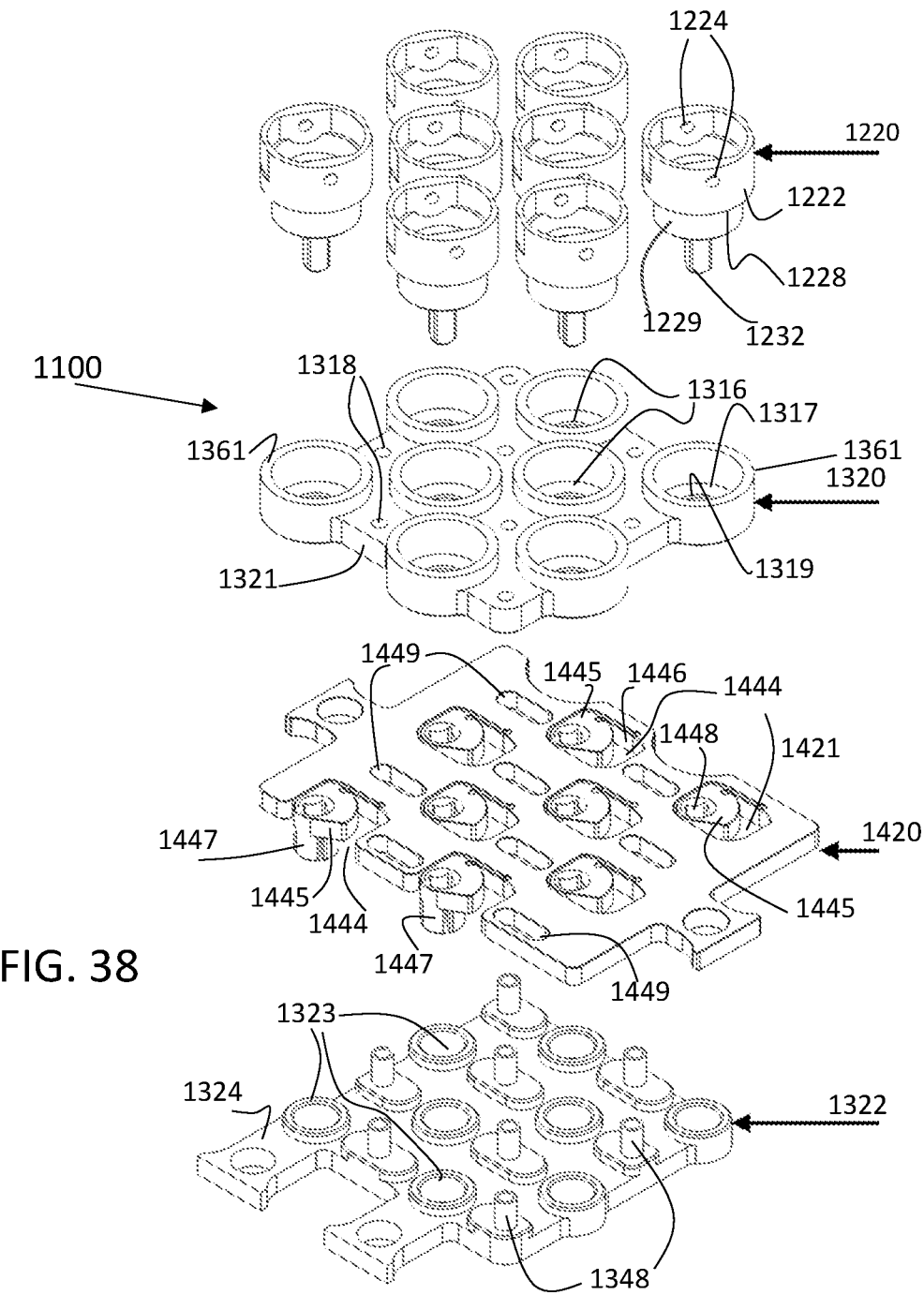
FIG. 38 is an exploded view of a subassembly including a compliant mechanism for orienting drive rollers in a drive roller assembly for selectively activating object-diverting rollers in the conveyor system of FIG. 1.
Figure 39:
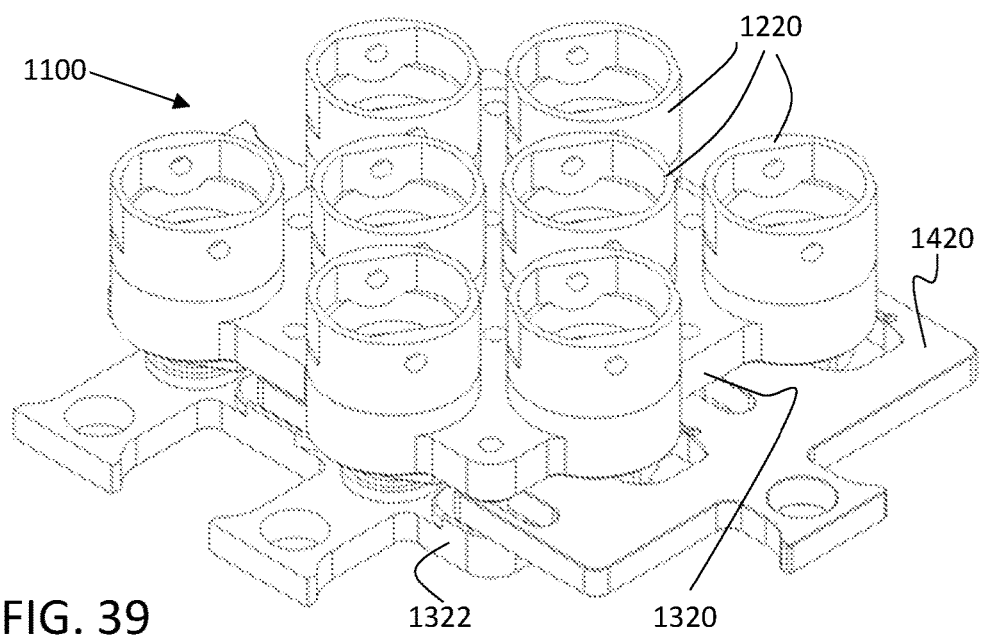
FIG. 39 is an assembled view of the subassembly of FIG. 38.

In another embodiment, a translatable orientation device for a drive roller assembly may comprise a compliant mechanism for causing drive roller carriers to pivot about their vertical axes. Referring to FIGS. 38 and 39, a drive mechanism 1100 including an array of drive rollers for selectively engaging object-carrying rollers in a conveyor belt to selectively effect diversion of objects on the conveyor belt comprises a plurality of pivotable roller carriers 1220 for housing freely-rotating drive rollers (not shown). A fixed top support sheet 1320 includes carrier-receiving openings 1316, as well as fastener openings 1318 for connecting the top support sheet 1320 to a fixed bottom support sheet 1322. A translatable orientation device 1420 is movably sandwiched between the top support sheet 1320 and the bottom support sheet 1322. The translatable orientation device can slide back and forth to selectively pivot the roller carriers about a vertical axis.

The top support plate 1320 may comprise a planar substrate 1321 including vertical walls 1360 having top edges 1361 extending up from the planar substrate and encircling at least a portion of the openings 1316. The openings 1316 narrow at the bottom to form a shelf 1317 and a smaller opening 1319 at the bottom of the top support plate 1320, which may be formed of injection-molded plastic or another suitable material.

The illustrative roller carriers 1220 include a retainer ring 1222 with diametrically opposite holes 1224 supporting the ends of an axle of a drive roller. A bottom rim 1228 of the retainer ring 1222 rests on the top edge 1361 of the top support plate 1320 and turns thereabout. An upper journal stem 1229 extends downwards from the retainer ring 1222 and is seated and pivotable within the openings 1316. A downward-extending stem 1232 extends through the smaller opening 1318 and is received in a corresponding opening 1448 in the translatable orientation device 1420. The illustrative stem 1232 has a square or otherwise polygonal cross-section, but the invention is not so limited.

In one embodiment, the bottom rim 1228 of the retainer ring 1220 can be shaped with ramp sections and the top edge 1361 of the top support plate can also be shaped to cause the roller carrier 1220 to selectively raise and lower the carried drive roller as the roller carrier 1220 pivots about its vertical axis, as described above.

The illustrative translatable orientation device 1420 comprises a planar substrate 1421 including elongated openings 1444 including a cam mechanism 1445 connected to a flexible leaf 1446 that is connected to the main portion of the planar substrate 1421. The openings 1448 in the cam mechanism are sized and shaped to receive corresponding stems 1232 of the roller carriers. The openings are sized and configured so that rotation of the cam 1445 pivots the received roller carrier 1220. While the illustrative openings 1448 and associated stems 1232 are square, the invention is not so limited, and can comprises any geometry that rotationally locks the components together. A boss 1447 extends downwards from the bottom of the cam and is sized and shaped to be received in openings 1323 in the bottom support plate.

The translation device 1420 further includes slots 1449 to accommodate fasteners connecting the top support plate 1320 and the bottom support plate 1322.

The bottom support sheet 1322 comprises a planar substrate 1324 including openings 1323 for receiving the cam bosses 1447. The openings 1323 may be raised relative to the substrate 1324. Bosses 1348 for receiving fasteners to connect the top and bottom support plate also extend up from the substrate 1324 and extend through the slots 1449 and into the fastener openings 1318 when the assembly is assembled.

An actuator, such as the actuator 460 described above or another suitable device, selectively moves the translatable orientation device to orient the roller carriers. The actuator can slide the translatable orientation device back and forth in a linear direction 1500, as shown in FIGS. 40-43, to pivot the roller carriers. The illustrative cam 1445 may be fan-shaped, including diverging straight side edges 1452, 1453, a convex curved back edge 1454 and a larger convex curved front edge 1455, but the invention is not so limited.

Figure 40:
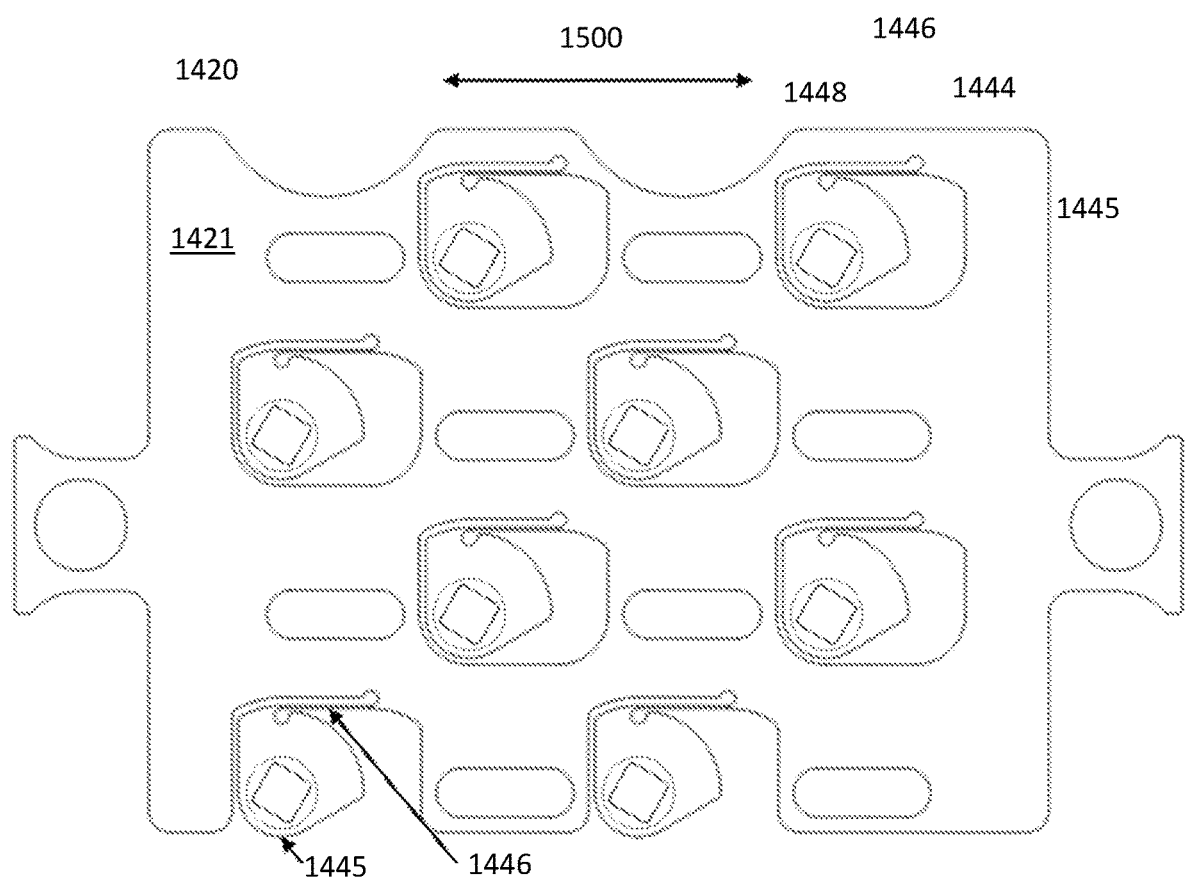
FIG. 40 is a top view of the translatable orientation plate of FIGS. 38 and 39 in a default position.
Figure 41:
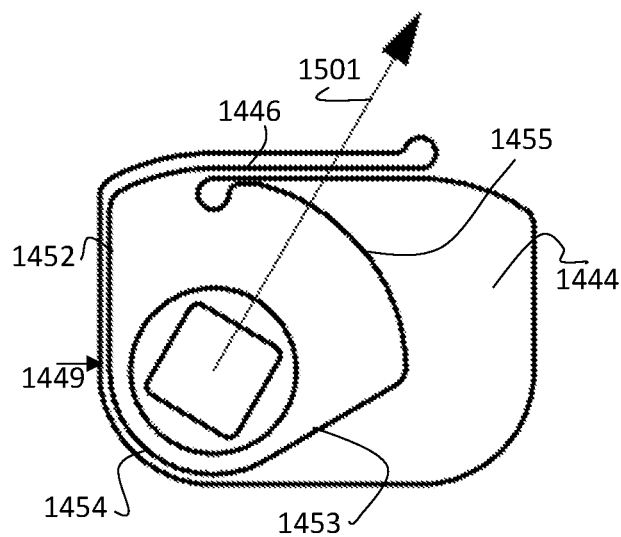
FIG. 41 is a detailed top view of a cam mechanism of the translatable orientation plate of FIG. 40.
Figure 42:
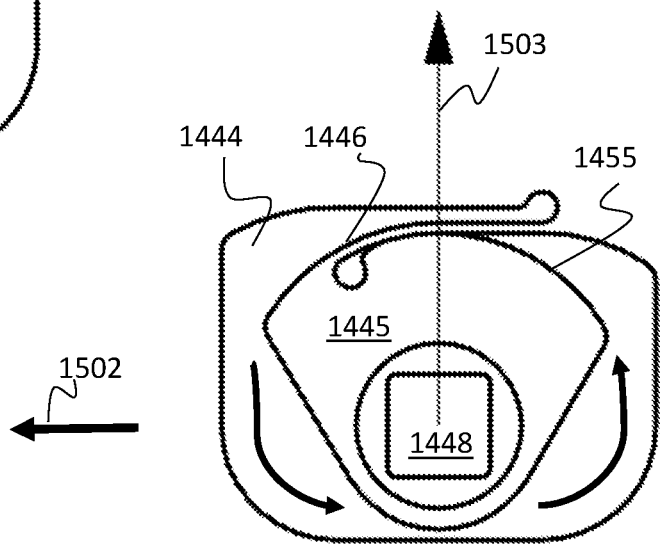
FIG. 42 is a top view of the cam mechanism of FIG. 41 in an intermediate position.
Figure 43:
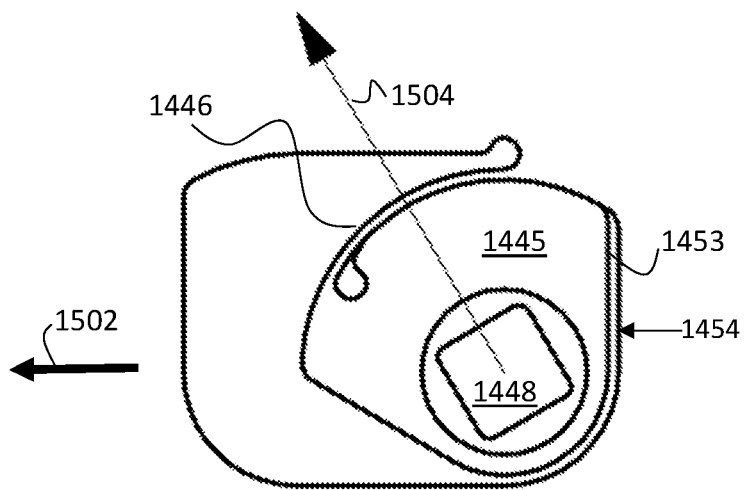
FIG. 43 is a top view of the cam mechanism of FIG. 41 in a translated position.

In a default orientation, such as that shown in FIGS. 40 and 41, the cam 1445 is disposed in a first section of the elongated slot 1444, with a first side edge adjacent a side edge 1449 of the elongated slot 1444 and the opening 1448 holding the roller carrier 1220 in a first orientation. In the illustrative first orientation, a corresponding drive roller will roll in direction 1501. When the translation device moves in a direction 1502, shown in FIG. 35, the leaf 1446, which connects the cam 1445 to the plate 1420, pushes or pulls on its mating cam 1445 at its circumference, causing the cam 1445, which is fixed laterally by the bottom support plate 1322, to rotate. During rotation, the leaf 1446 wraps around the circumference or front edge 1455 of the cam 1445. In a central orientation, shown in FIG. 42, a drive roller will roll in direction 1503. The actuator can continue to move the orientation device in direction 1502 to a fully translated position, shown in FIG. 43. In the fully translated position, the second side edge 1453 of the cam 1445 abuts a second side edge 1454 of the elongated slot 1444, which places the roller carrier in a third orientation, in which the drive roller rotates in direction 1504, which is about 90° rotated left of the first direction 1501. The roller orientation can be an infinite gradient between the default orientation and the fully translated orientation. The level of gradation depends only on the actuator type used. For example, a three-position pneumatic actuator assembly can only achieve left, right, and center. But an electric stepper motor with a ball screw could achieve those three positions plus everything in between.

Other suitable means for selectively pivoting the roller carriers may be used.

While particular embodiments have been disclosed in detail in the foregoing description and drawings for purposes of example, it will be understood by those skilled in the art that variations and modifications thereof can be made without departing from the scope of the disclosure.

What is claimed is:

1. A drive roller assembly for selectively actuating conveyor belt rollers in a conveyor belt configured to divert objects atop the conveyor belt rollers as the conveyor belt advances along a carryway, the drive roller assembly comprising:
    a plurality of pivotable roller carriers, each carrier housing a freely rotatable drive roller that contacts the conveyor belt rollers from below the conveyor belt;
    a three-dimensional top support plate including an array of openings arranged in a quincunx pattern, wherein the roller carriers extend through the openings, the three-dimensional top support plate including at least one corrugated vertical wall extending longitudinally on the top support plate between a first and second column of openings, each corrugated vertical wall including a plurality of notches in a top edge for receiving a wearstrip, with each curve in the corrugated vertical wall partially surrounding an opening;
    a translatable orientation device for engaging the pivotable roller carriers to change the orientation of the drive rollers with respect to the conveyor belt rollers; and
    an actuator for selectively moving the translatable orientation device to pivot the pivotable roller carriers.

2. The drive roller assembly of claim 1, wherein the openings in the three-dimensional top support plate include shaped, upwardly-facing camming surfaces for selectively raising the roller carriers when the roller carriers pivot to a selected orientation.

3. The drive roller assembly of claim 1, further comprising a wearstrip having a bulb-shaped protrusion received in the notches.

4. The drive roller assembly of claim 3, wherein the notches are formed at inflection points in the corrugated vertical wall.

5. The drive roller assembly of claim 3, further comprising a wearstrip stopper downstream of the wearstrip.

6. The drive roller assembly of claim 5, wherein the wearstrip stopper comprises:
    an upper wearstrip portion configured to align with an upper surface of the wearstrip;
    a pair of legs on a first side of the upper wearstrip portion; and
    an offset leg on a second side of the upper wearstrip portion.

7. The drive roller assembly of claim 6, wherein the corrugated vertical wall includes vertical slots for receiving the legs of the wearstrip stopper.

8. The drive roller assembly of claim 1, further comprising a second corrugated vertical wall between a third and fourth column of openings for receiving a wearstrip.

9. The drive roller assembly of claim 1, wherein the corrugated vertical wall is integral with the top support plate.

10. The drive roller assembly of claim 1, wherein the corrugated vertical wall is connected to the top support plate using connectors.

11. The drive roller assembly of claim 1, wherein the corrugated vertical wall includes curved gussets having top surfaces that angle down towards the openings.

12. The drive roller assembly of claim 11, wherein faces of the corrugated vertical wall that face an opening are curved to match the shape of the opening and faces of the corrugated vertical wall opposite the openings are flat.

13. The drive roller assembly of claim 1, wherein the translatable orientation device includes a movable plate having a plurality of laterally elongated openings, each elongated opening including a flexible leaf connecting a cam to the movable plate, wherein each cam has an opening for receiving and rotationally locking to a pivotable roller carrier.

14. The drive roller assembly of claim 1, further comprising a three-dimensional bottom support plate fixed to the top support plate and sandwiching the translatable orientation device between the top support plate and bottom support plate.

15. The drive roller assembly of claim 14, wherein the bottom support plate includes guidance features extending through the translatable orientation device.

16. The drive roller assembly of claim 14, wherein the bottom support plate includes a plurality of openings for receiving stems of the roller carriers, each opening including at least one vertical slot for receiving a tab on an associated roller carrier.

17. The drive roller assembly of claim 14, further comprising a support frame below the bottom support plate, the support frame having a channel shape for housing the actuator.

18. The drive roller assembly of claim 17, further comprising a static actuator clevis for connecting a fixed rod eye of the actuator to the support frame and a moving actuator clevis for connecting a dynamic eye of the actuator to the translatable orientation device.

19. The drive roller assembly of claim 18, wherein the translatable orientation device comprises two spaced-apart sheets connected by the moving actuator clevis.

20. The drive roller assembly of claim 1, wherein the top support plate comprises a plurality of modular plates extending laterally across the width of the assembly.

21. The drive roller assembly of claim 1, wherein each roller carrier includes a sector of gear teeth that do not extend around the entire periphery of the roller carrier for engaging teeth on the translatable orientation device.

22. A method of assembling a drive roller assembly, comprising the steps of:
  inserting a plurality of fasteners into lateral top slots extending from a top wall of a support frame;
  placing a plurality of bottom support plate modules over the support frame, such that a plurality of fasteners are inserted through fastener openings in each bottom support plate module, each bottom support plate module including an array of bottom roller carrier openings;
  placing a translatable orientation device over the plurality of bottom support plate modules, each translatable orientation device including an array of elongated orienting openings, each elongated orienting opening including a linear array of teeth;
  placing a plurality of top support plate modules over the translatable orientation device, such that a plurality of fasteners are inserted through fastener openings in each top support plate module, each top support plate modules including an array of top roller carrier openings;
  aligning and fastening edge top and bottom support plate modules to each other;
  aligning remaining top and bottom support plate modules relative to the edge top and bottom support plate modules using an alignment tool;
  fastening remaining top and bottom support plate modules to each other;
  aligning the translatable orientation device relative to the top and bottom support plate modules using the alignment tool, so that the bottom roller carrier openings, orienting openings and top roller carrier openings are aligned with each other;
  attaching a moving actuator clevis to the translatable orientation device;
  mounting an actuator and static actuator clevis within the support frame; and
  inserting roller carriers through the aligned top roller carrier openings, orienting openings and bottom roller carrier openings.

\* \* \* \* \*